United States Patent
Nakache et al.

(10) Patent No.: US 7,103,109 B2
(45) Date of Patent: Sep. 5, 2006

(54) RANDOMLY INVERTING PULSE POLARITY IN AN UWB SIGNAL FOR POWER SPECTRUM DENSITY SHAPING

(75) Inventors: Yves-Paul Nakache, Murray Hill, NJ (US); Andreas Molisch, North Plainfield, NJ (US); Jinyun Zhang, New Providence, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 237 days.

(21) Appl. No.: 10/361,315

(22) Filed: Feb. 10, 2003

(65) Prior Publication Data

US 2004/0156444 A1    Aug. 12, 2004

(51) Int. Cl.
*H04L 27/04* (2006.01)
(52) U.S. Cl. ...................................... 375/295
(58) Field of Classification Search ................ 375/295,
375/259, 260, 239, 238, 302, 324, 340, 271,
375/138, 146, 130, 242; 332/112; 327/172,
327/159, 176; 370/483, 485; 341/157, 112,
341/111
See application file for complete search history.

(56) References Cited

U.S. PATENT DOCUMENTS

| | | | |
|---|---|---|---|
| 5,994,973 A * | 11/1999 | Toki | 332/109 |
| 6,107,850 A * | 8/2000 | Shimizu | 327/172 |
| 6,563,880 B1* | 5/2003 | Hunsinger et al. | 375/260 |
| 6,611,223 B1* | 8/2003 | Low et al. | 341/157 |
| 6,625,229 B1* | 9/2003 | Dress et al. | 375/295 |
| 2003/0108133 A1* | 6/2003 | Richards | 375/351 |
| 2003/0146800 A1* | 8/2003 | Dvorak | 332/112 |
| 2004/0008617 A1* | 1/2004 | Dabak et al. | 370/208 |
| 2004/0125859 A1* | 7/2004 | Green et al. | 375/295 |
| 2004/0156504 A1* | 8/2004 | Mo et al. | 380/210 |
| 2005/0129153 A1* | 6/2005 | McCorkle | 375/346 |
| 2005/0175068 A1* | 8/2005 | Nakache et al. | 375/130 |

FOREIGN PATENT DOCUMENTS

WO    WO 01/73965 A2    10/2001
WO    WO 01/93441 A1    12/2001

* cited by examiner

Primary Examiner—Emmanuel Bayard
(74) Attorney, Agent, or Firm—Dirk Brinkman; Andrew J. Cardin

(57) ABSTRACT

A method eliminates spectral lines in a time hopping ultra wide bandwidth signal. First, a train of pulses is generated from input symbols. The pulses are then modulated in time according to symbols. The modulation can use pulse position modulation and time hopping. A polarity of the pulses is inverted randomly before transmitting the pulses as an ultra wide bandwidth signal. By randomly inverting the polarity of the pulses spectral lines in the ultra wide bandwidth signal are eliminated.

29 Claims, 27 Drawing Sheets

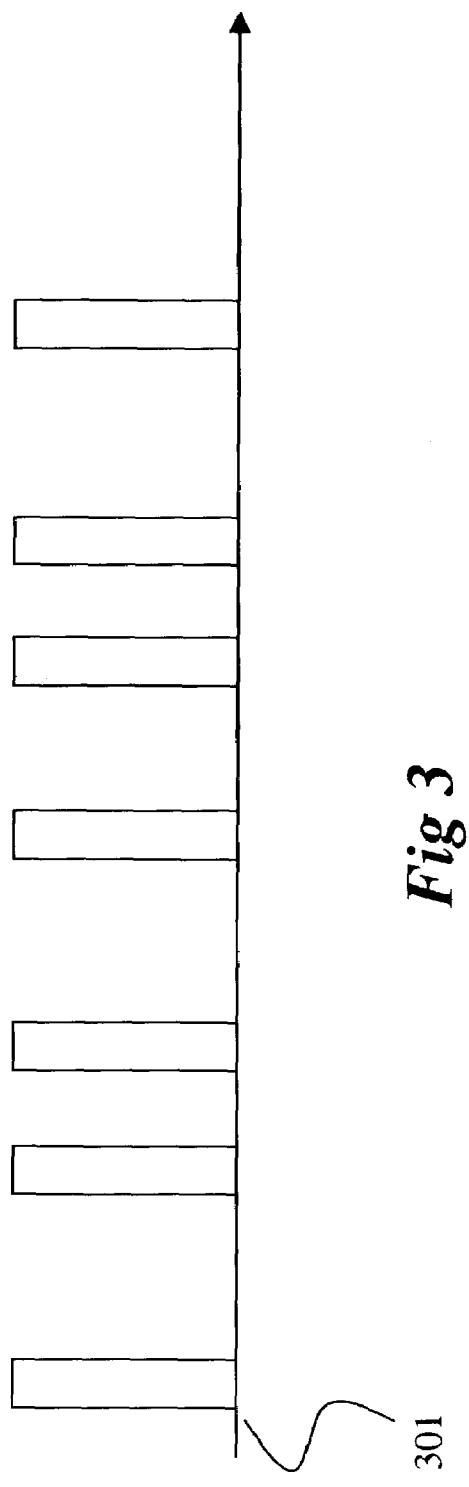
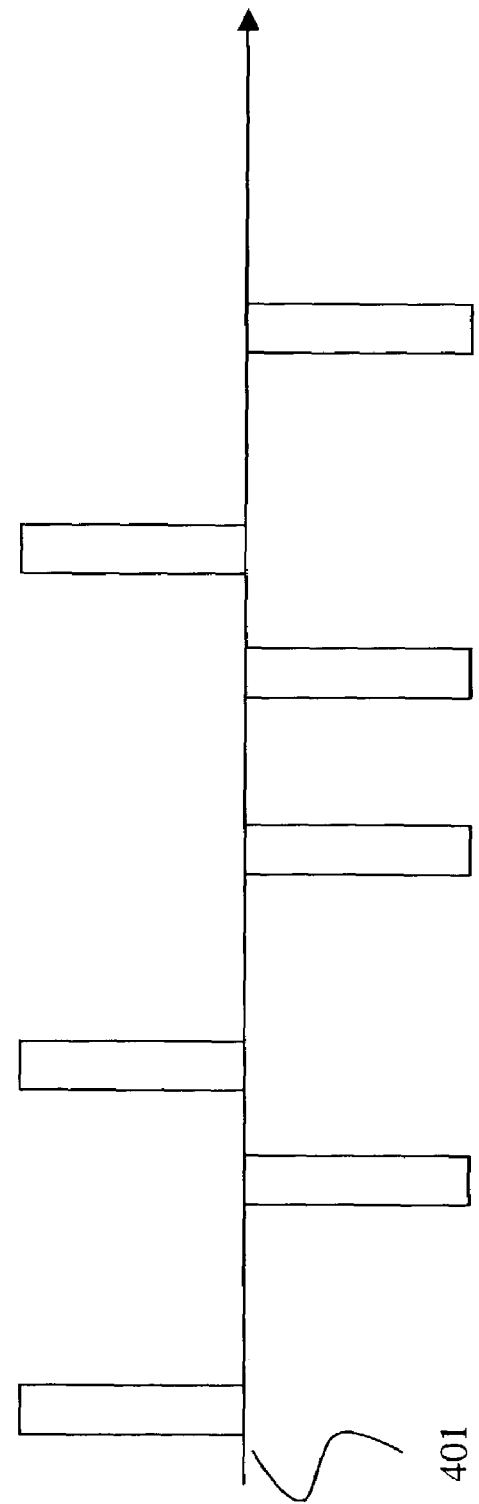

RANDOMLY INVERTING PULSE POLARITY IN AN UWB SIGNAL FOR POWER SPECTRUM DENSITY SHAPING

FIELD OF THE INVENTION

This invention relates generally to wireless communication, and more particularly to communicating with ultra wide bandwidth (UWB) systems.

BACKGROUND OF THE INVENTION

Ultra wide bandwidth (UWB) systems have recently received considerable attention for wireless radio communication systems. Recently, the US Federal Communications Commission (FCC) has allowed UWB systems for limited indoor and outdoor applications.

The IEEE 802.15.3a standards group has defined performance requirements for the use of UWB in short range indoor communication system. Throughput of at least 110 Mbps at 10 meters are required. This means that the transmission data rate must be greater. Furthermore, a bit rate of at least 200 Mbps is required at four meters. Scalability to rates in excess of 480 Mbps is desirable, even when the rates can only be achieved at smaller ranges. These requirements provide a range of values for a pulse repetition frequency (PRF).

In February 2002, the FCC released the "First Order and Report" providing power limits for UWB signals. The average limits over all useable frequencies are different for indoor and outdoor systems. These limits are given in the form of a power spectral density (PSD) mask 200, see FIG. 2. In the frequency band from 3.1 GHz to 10.6 GHz, the PSD is limited to −41.25 dBm/MHz. The limits on the PSD must be fulfilled for each possible 1 MHz band, but not necessarily for smaller bandwidths For systems operating above 960 MHz, there is a limit on the peak emission level contained within a 50 MHz bandwidth centered on the frequency, $f_M$, at which the highest radiated emission occurs. The FCC has adopted a peak limit based on a sliding scale dependent on an actual resolution bandwidth (RBW) employed in the measurement. The peak EIRP limit is 20 log (RBW/50) dBm, when measured with a resolution bandwidth ranging from 1 MHz to 50 MHz. Only one peak measurement, centered on $f_M$, is required. As a result, UWB emissions are average-limited for PRFs greater than 1 MHz and peak-limited for PRFs below 1 MHz.

These data rate requirements and emission limits result in constraints on the pulse shape, the level of the total power used, the PRF, and the positions and amplitudes of the spectral lines.

In UWB systems, a train of electromagnetic pulses are used to carry data. FIG. 1 shows an example symbol structure 100 of UWB signal with a one pulse per frame 101, i.e., the symbol length, a time hopping (TH) sequence of eight pulses 102 or subframes, and a subframe 103 including a TH margin. The signal comprises symbols 110 equal to a frame length, subframes 111, with a pulse position modulation (PPM) margin 112, and a TH margin 113. Instead of grouping N pulses to create a symbol of N frame durations, the frame duration is split into N subframes with 1 pulse per subframe, as shown in FIG. 1.

Many UWB signals use pulse position modulation (PPM) for modulation, and time hopping (TH) spreading for multiple access. This results in a dithered pulse train. The spectrum of the signal can be obtained by considering this dithered signal as a M-PPM signal.

If the modulating sequence is composed of independent and equiprobable symbols, then the PSD for non-linear memoryless modulation is given by Equation 1 as:

$$G_s(f) = \frac{1}{M^2 T_s^2} \cdot \sum_{n=-\infty}^{+\infty} \left( \left| \sum_{i=0}^{M-1} S_i\left(\frac{n}{T_s}\right) \right|^2 \delta\left(f - \frac{n}{T_s}\right) \right) + \frac{1}{T_s}\left( \sum_{i=0}^{M-1} \frac{1}{M} \cdot |S_i(f)|^2 - \left| \sum_{i=0}^{M-1} \frac{1}{M} \cdot S_i(f) \right|^2 \right), \qquad (1)$$

where M denotes the number of symbols, $T_s$ the symbol period or frame, and $S_i$ the PSD of the $i^{th}$ symbol of the constellation.

Inherent in PPM, and as shown in FIG. 2, the first term of Equation (1) causes spectral lines which are outside the FCC mask 200. The spectrum of a signal with a 2-PPM usually contains spectral lines spaced by the PRF. Consequently, the amplitude of these spectral lines can be $10*\log_{10}(T_s^{-1})$ dB above the level of the continuous part of the spectrum. That corresponds to 80 dB for the 100 Mbps data rate mandated by IEEE 802.15a.

The FCC measurement procedures average the power of these spectral lines over the resolution bandwidth. Even then, the power level remains higher than the threshold, and thus violate the FCC limits or require a reduction of the total power. Time hopping is generally used to reduce the problem of spectral lines by reducing their number in a given frequency band. However TH does not necessarily attenuate the amplitude of the remaining spectral lines.

In a non-periodic time hopped pulse train, each individual pulse can be in one of M equally probable positions within its frame. This signal has the same spectrum as a M-PPM signal with the same PRF, $f_{PR}$, and uncorrelated modulated data. Increase M enlarges the constellation of the PPM, and therefore the number of pulse positions within the frame. If these positions are uniformly spaced within the frame, then all the spectral lines that are not a multiple of $M \cdot f_{PR}$ disappear.

Instead of grouping N pulses to create a symbol of N frame durations, the former frame duration is split into N subframes with one pulse per subframe 102 as shown in FIG. 1. As a consequence, the PRF is $N \cdot f_{PR}$. Hence, this non-periodic TH pulse train is composed of N pulses per frame, and each pulse can take M positions within the duration of a subframe. The spectrum of this pulse train is the same as for a M-PPM signal with a PRF=$N*f_{PR}$. As a result, the spectral lines are spaced by $M.N.f_{PR}$ when the M pulse positions are uniformly spaced. If M goes to infinity, which is equivalent to a uniform distribution of the pulse, then all spectral lines occur at infinite spacing and thus effectively vanish.

However, in order to consider realistic pulse trains that can be used in the generation of UWB signals, some modifications need to be made. If pulses are truly uniformly distributed within each frame, overlaps may happen at the junction between subframes when M increases. Margins or guard intervals eliminate these overlaps.

In order to modulate the symbols by PPM, additional margins are introduced between frames. However, by introducing margins, the uniform distribution of pulse positions within each subframe is destroyed, which has an impact on the spectral lines. Furthermore TH sequence is limited in time and contributes to the periodicity of the signal and undesirable spectral lines as shown in FIG. 2.

Therefore, there is a need to provide a system and method that can eliminate these undesirable spectral lines.

SUMMARY OF THE INVENTION

Commonly, ultra wide bandwidth (UWB) systems communicate with trains of short-duration pulses that have a low duty-cycle. Thus, the energy of the radio signal is spread very thinly over a wide range of frequencies. Almost all of the known systems use a combination of time-hopping (TH) spreading for multiple access, and pulse position modulation (PPM) as a modulation format. This combination results in spectral lines that either lead to a violation of FCC requirements, or require a significant reduction in power, which decreases performance and range of the signal.

The invention provides a method for eliminating spectral lines caused by transmitting data using PPM and TH sequences. The spectral lines are eliminated by randomly changing the polarity of the pulses of the signal. Hereinafter, the word 'random' means pseudo-random as commonly used in the art.

Changing the pulse polarity does not have a negative impact on the performance of the transceiver because the polarity of the signal is not used to carry information. By changing randomly polarity of the pulses of the signal, the discrete frequency components of the spectrum vanish. Furthermore, this randomization of the polarity can be used to shape the spectrum of the signal.

A method eliminates spectral lines in a time hopping ultra wide bandwidth signal. First, a train of pulses is generated. The pulses are then modulated in time according to symbols. A polarity of the pulses is inverted randomly before transmitting the pulses as an ultra wide bandwidth signal.

BRIEF DESCRIPTION OF THE DRAWINGS

FIG. 3 is a timing diagram of a pulse train before modification;

FIG. 4 is a timing diagram of a pulse train after modification according to the invention;

DETAILED DESCRIPTION OF THE PREFERRED EMBODIMENT

To solve the problem of discrete frequency components in a spectrum of an ultra wide bandwidth (UWB) radio signal, the invention inverts randomly the polarity of pulses. The resultant signal with randomly inverted polarity pulse is compliant with FCC regulations.

One could use binary phase-shift keying (BPSK) to randomize the polarity of the pulses. BPSK would also reduce the complexity of the system. However, with BPSK, the channel conditions can modify the polarity of the signal and destroy the data.

Therefore, the invention inverts the polarity of the pulses to shape the spectrum of the signal without carrying information. Thus, it is unnecessary to have zero mean information symbols to control the spectral characteristics of the modulated signal. The inversions of polarity can be applied to symbols, i.e., the set of pulses composing a symbol taken together, as well to individual pulses. The effect of this modification according to the invention is to eliminate spectral lines caused by, for example, pulse position modulation (PPM), and other dithering techniques, such as time hopping (TH) spreading used in UWB systems.

Thus, the method according to the invention solves the problem of spectral lines caused by non-equiprobable symbols and non-antipodal modulation schemes at the same time. Furthermore, the polarity of the signal can be specifically used to shape the spectrum of the UWB signal.

Random Polarity Inversion

Figure 1:
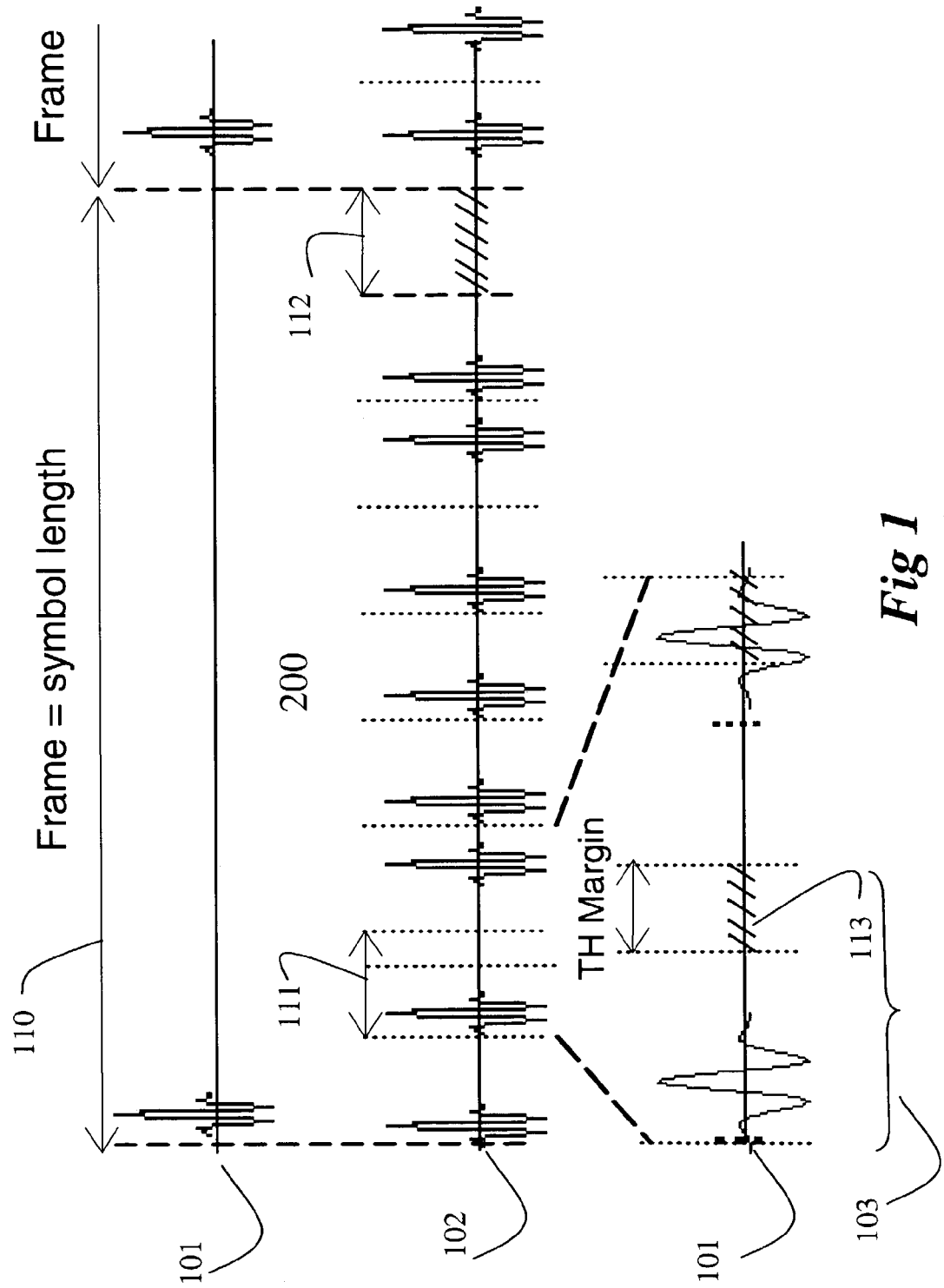
FIG. 1 is a timing diagram of a pulse train signal to be modified according to the invention.
Figure 2:
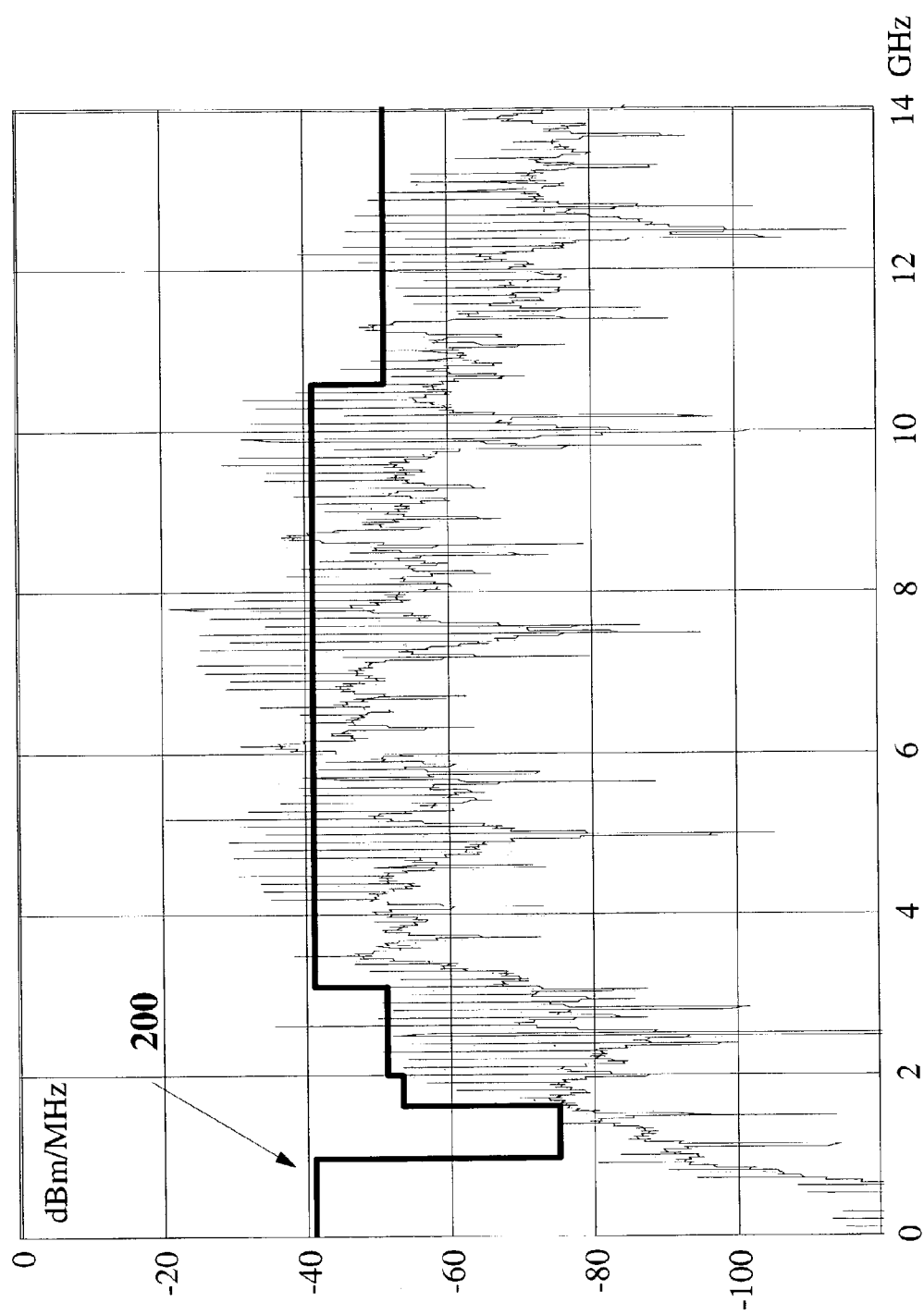
FIG. 2 is a power spectral density (PSD) graph of a prior art UWB signal.

FIG. 3 shows a signal 301 that includes a train of pulses to be processed according to the invention. The spectrum of the transmitted signal 301, after pulse position modulation (PPM) and time hopping (TH) spreading, for the purpose of ultra wide bandwidth wireless communication, contains undesirable spectral lines, as shown in FIG. 2.

FIG. 4 shows a transmitted waveform 401 where the polarity of pulses is randomly inverted according to the invention to eliminate the spectral lines.

The discrete part of the spectral density of a pulse train is given by Equation (2) as:

$$G_s(f) = \frac{1}{T_s^2} \cdot \sum_{n=-\infty}^{+\infty} \left( \left| \sum_{i=0}^{M-1} P_i \cdot S_i\left(\frac{n}{T_s}\right) \right|^2 \delta\left(f - \frac{n}{T_s}\right) \right), \quad (2)$$

where, M is the number of symbols, Ts the symbol period, $S_i$ is the power spectral density (PSD) of the $i^{th}$ symbol for $I\epsilon[0,M-1]$, and $P_i$ is the probability of the $i^{th}$ symbol.

By changing randomly the polarity of M symbols $S_i$, Equation (1) can be rewritten as a discrete part of the spectral density of a pulse train composed of 2*M antipodal symbols.

The symbols of each antipodal pair have the probability $P_i/2$, and the Fourier transform $S_i$ and $-S_i$. As a result, the spectral lines vanish as given by Equation (3):

$$G_s(f) = \frac{1}{T_s^2} \cdot \sum_{n=-\infty}^{+\infty} \left( \left| \sum_{i=0}^{M-1} \left( \frac{P_i}{2} \cdot S_i\left(\frac{n}{T_s}\right) - \frac{P_i}{2} \cdot S_i\left(\frac{n}{T_s}\right) \right) \right|^2 \delta\left(f - \frac{n}{T_s}\right) \right) = 0. \quad (3)$$

There are several polarity inversion embodiments possible considering the main idea behind the invention, including:

One pulse per symbol
Pulse Position Modulation
Pulse Amplitude Modulation
Multiple pulses per symbol
Pulse Position Modulation
Random polarity of pulses within the symbol duration
Random polarity from symbol to symbol
Identical set of different polarities for pulses in the symbol duration
Pulse Amplitude Modulation
Random polarity of pulses within the symbol duration
Random polarity from symbol to symbol
Identical sets of different polarities for pulses in the symbol duration from symbol to symbol
Different modulation schemes
Random polarity of pulses within the symbol duration
Random polarity from symbol to symbol
Identical set of different polarities for pulses in symbol duration
Random polarity for spectrum shaping
Random polarity of sub structure of a symbol—dual pulse waveform One Pulse Per Symbol As stated above, the randomization of the polarity of the whole symbol eliminates the spectral lines of the power spectrum density. These symbols have a specific waveform. A single pulse constitutes this waveform here. The power spectral density of the modulated signal depends on the power spectral density of the pulse.

Figure 5:
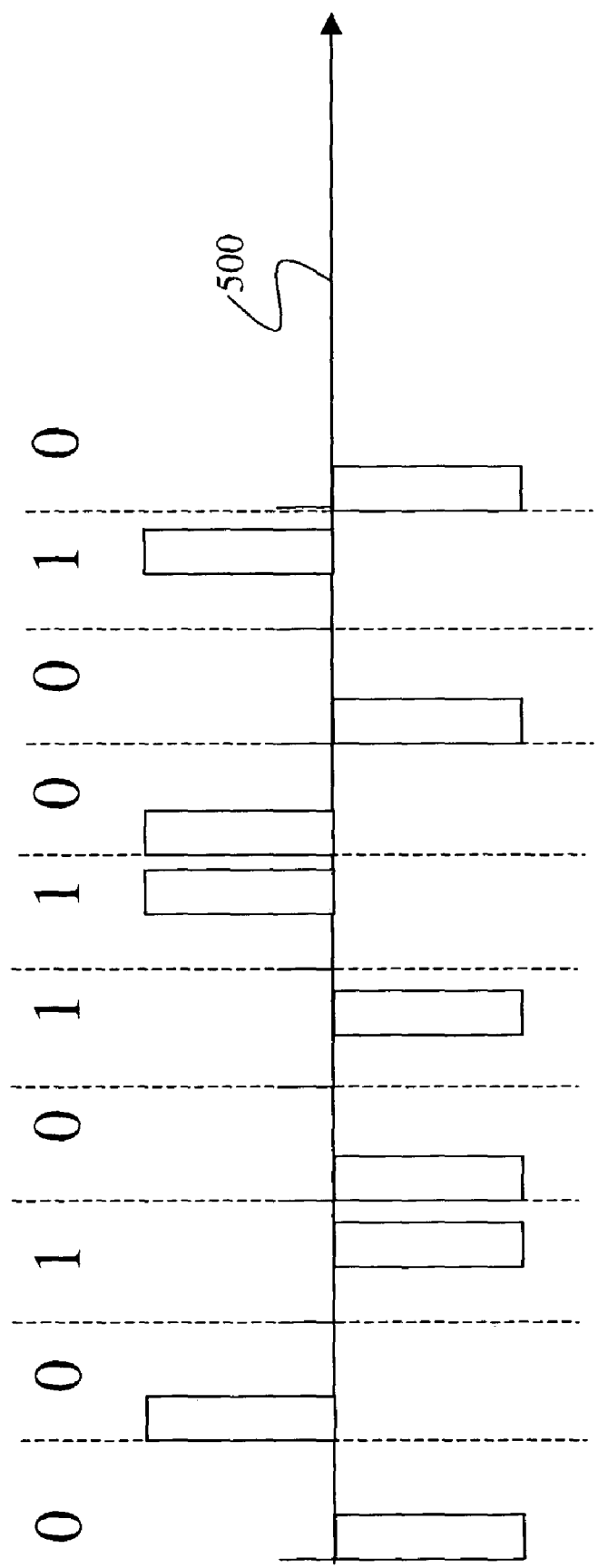
FIG. 5 is a pulse train with one pulse per symbol.

Pulse Position Modulation:

FIG. 5 shows an example pulse train 500 with a 2 PPM. The train is constituted by pulses dithered in time as follows. The pulse codes a logical zero in its original position. The pulse is delayed to encode a logical one.

The discrete part of the power spectrum density of a dithered pulse train using a 2-PPM is given by Equation (4) as:

$$G_s(f) = \frac{1}{T_s^2} \cdot \sum_{n=-\infty}^{+\infty} \left( \left| \sum_{i=0}^{1} P_i \cdot S_i\left(\frac{n}{T_s}\right) \right|^2 \delta\left(f - \frac{n}{T_s}\right) \right). \quad (4)$$

Figure 6:
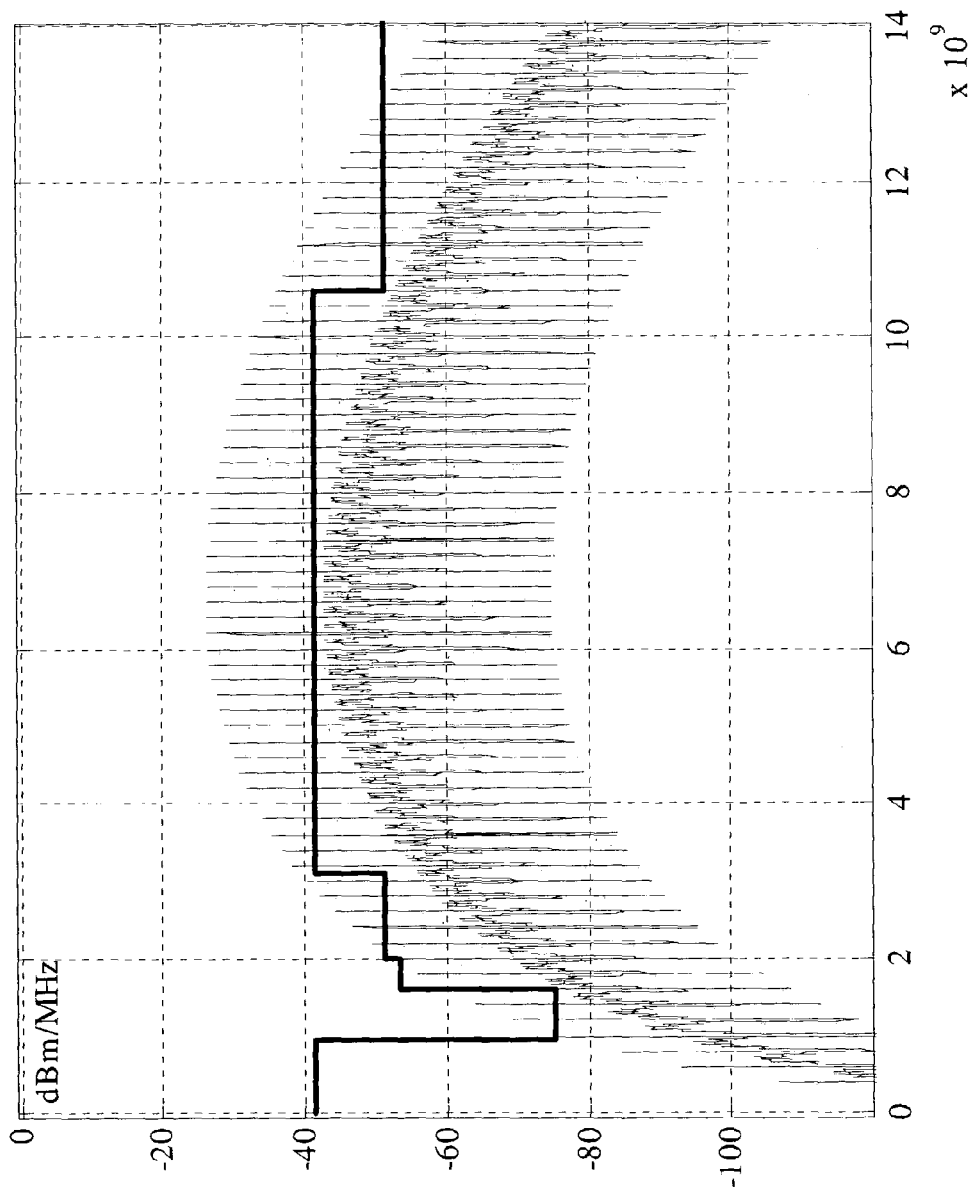
FIG. 6 is a prior art PSD of signal of FIG. 5 without modification.
Figure 7:
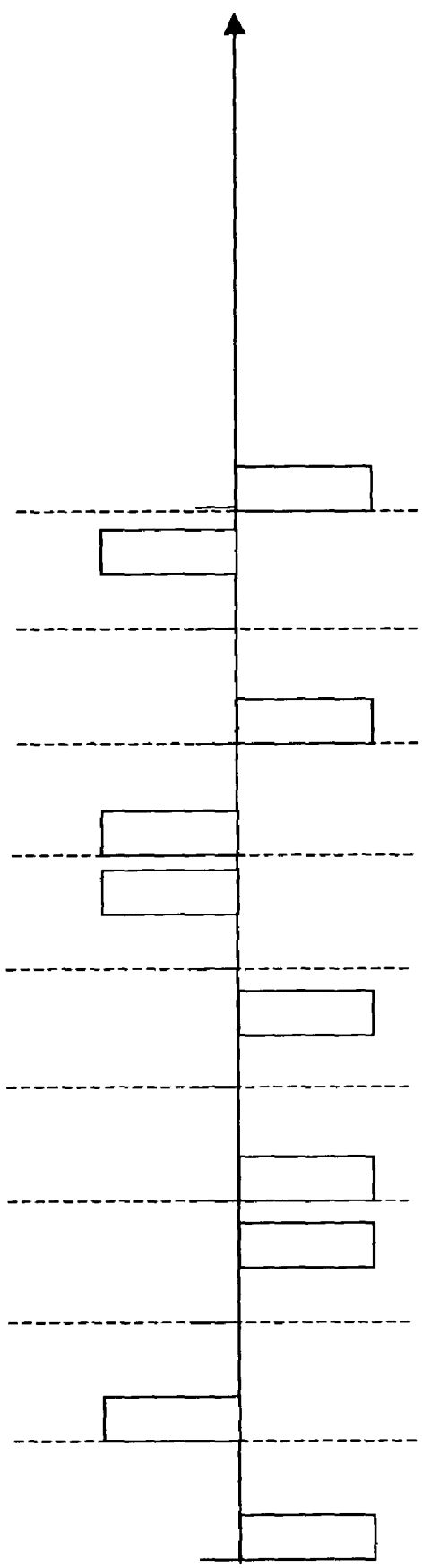
FIG. 7 is pulse train of FIG. 5 with randomly inverted polarity of pulses.

FIG. 6 shows the spectrum of this signal. FIG. 7 shows this signal after inverting randomly the polarity of individual pulses. After inverting randomly the polarity of the symbols, the discrete part of the power spectrum density is given by Equation (5) as:

$$G_s(f) = \frac{1}{T_s^2} \cdot \sum_{n=-\infty}^{+\infty} \left( \left| \sum_{i=0}^{1} \left( \frac{P_i}{2} \cdot S_i\left(\frac{n}{T_s}\right) - \frac{P_i}{2} \cdot S_i\left(\frac{n}{T_s}\right) \right) \right|^2 \delta\left(f - \frac{n}{T_s}\right) \right) = 0. \quad (5)$$

Figure 8:
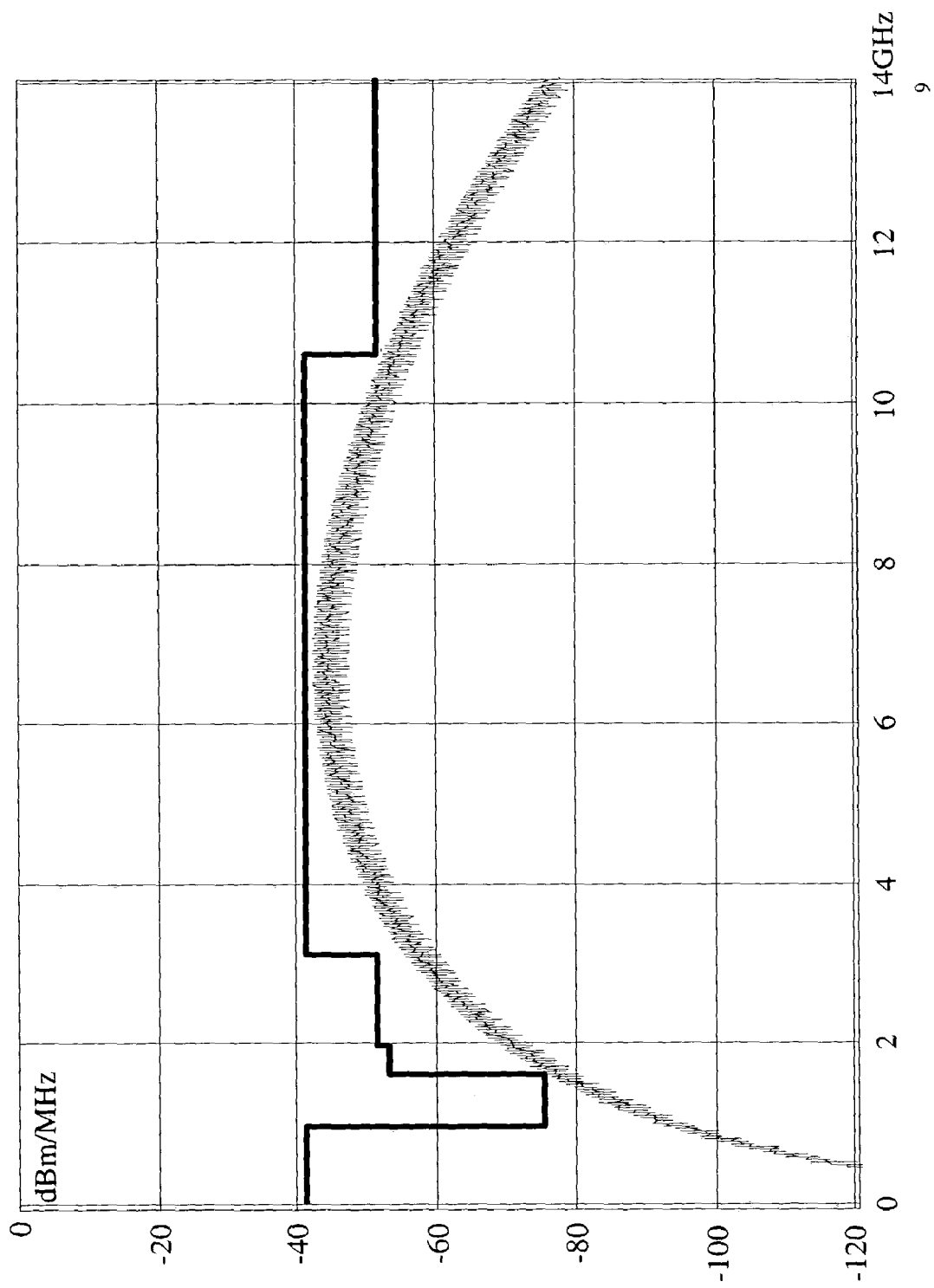
FIG. 8 is a PSD of the signal of FIG. 7 according to the invention.

As shown in FIG. 8, inverting the polarity in such a way makes all the discrete components, i.e., spectral lines, disappear to result in a continuous spectrum.

Figure 9:
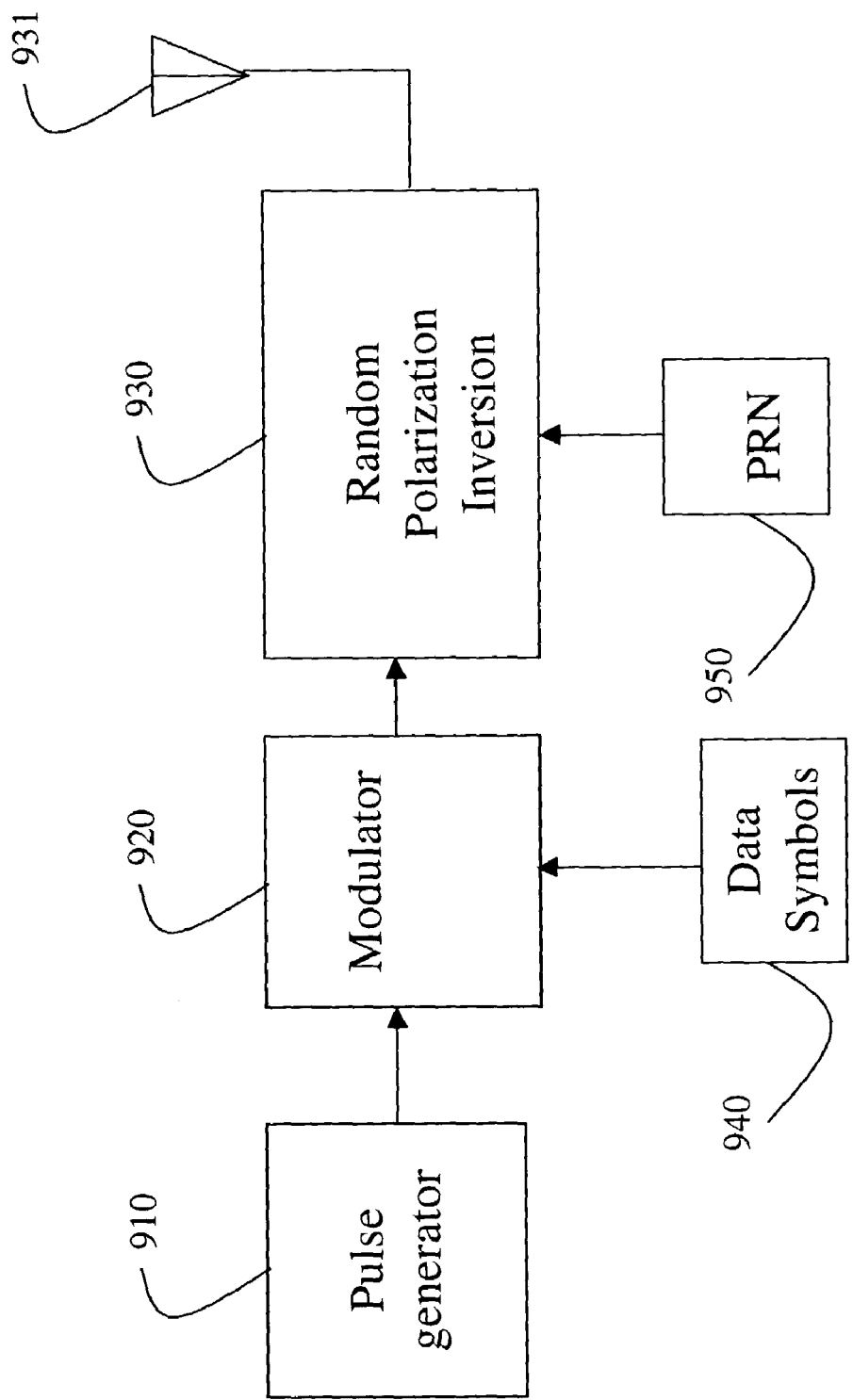
FIG. 9 is a block diagram of a system for randomly inverted pulses according to the invention.

FIG. 9 shows a system and method 900 for eliminating spectral lines in a dithered UWB signal according to the invention. The system includes a pulse generator 910, a modulator 920, and an inverter 930 coupled serially to an antenna 931. Generate pulses are dithered in time 920, i.e., by a time hopping sequence for multiuser access and by PPM for modulation, according to data symbols 940, and the polarity of resultant pulses are inverted according to a pseudo random number (PRN) 950.

Pulse Amplitude Modulation

Figure 10:
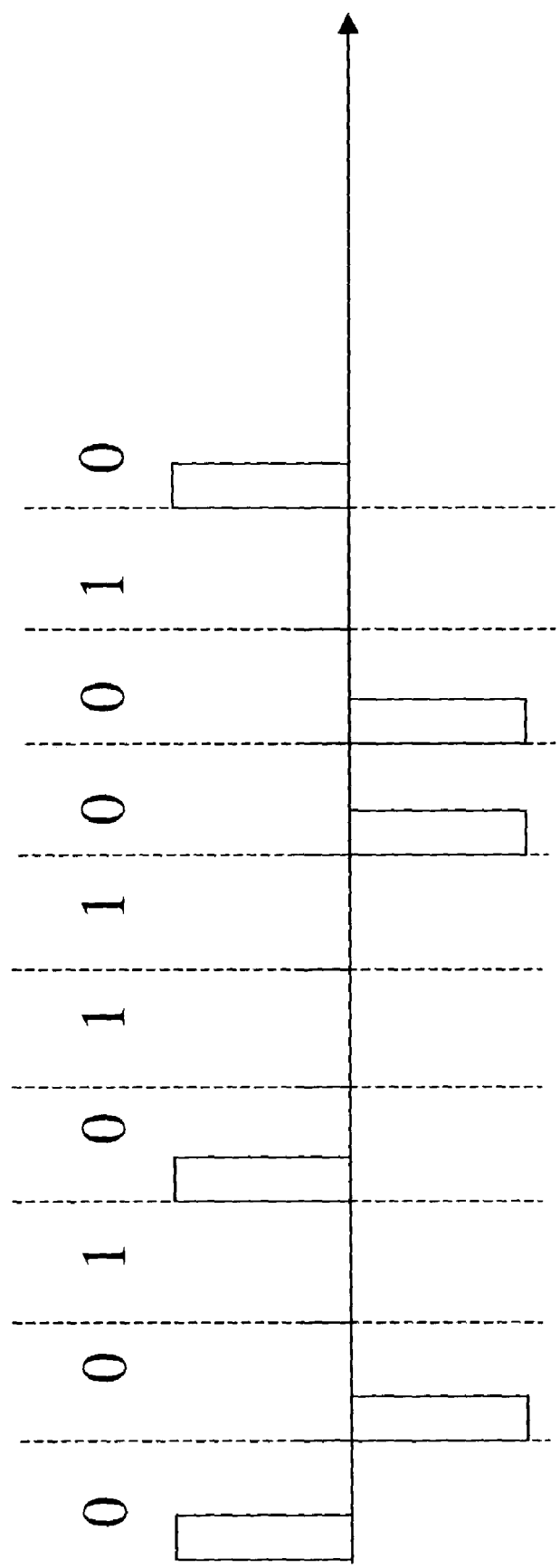
FIG. 10 is a pulse train generated by pulse amplitude modulation before modification.

Pulse amplitude modulation is accomplished by on/off keying (OOK) modulation, which is a special case of PAM. For every time period $T_p$, zero is represented by a pulse, and one by no pulse as shown in FIG. 10.

The discrete part of the power spectrum density of a OOK modulated signal is given by Equation (6) as:

$$G_s(f) = \frac{1}{T_s^2} \cdot \sum_{n=-\infty}^{+\infty} \left( \left| P_1 \cdot S_1\left(\frac{n}{T_s}\right) \right|^2 \delta\left(f - \frac{n}{T_s}\right) \right). \quad (6)$$

Figure 11:
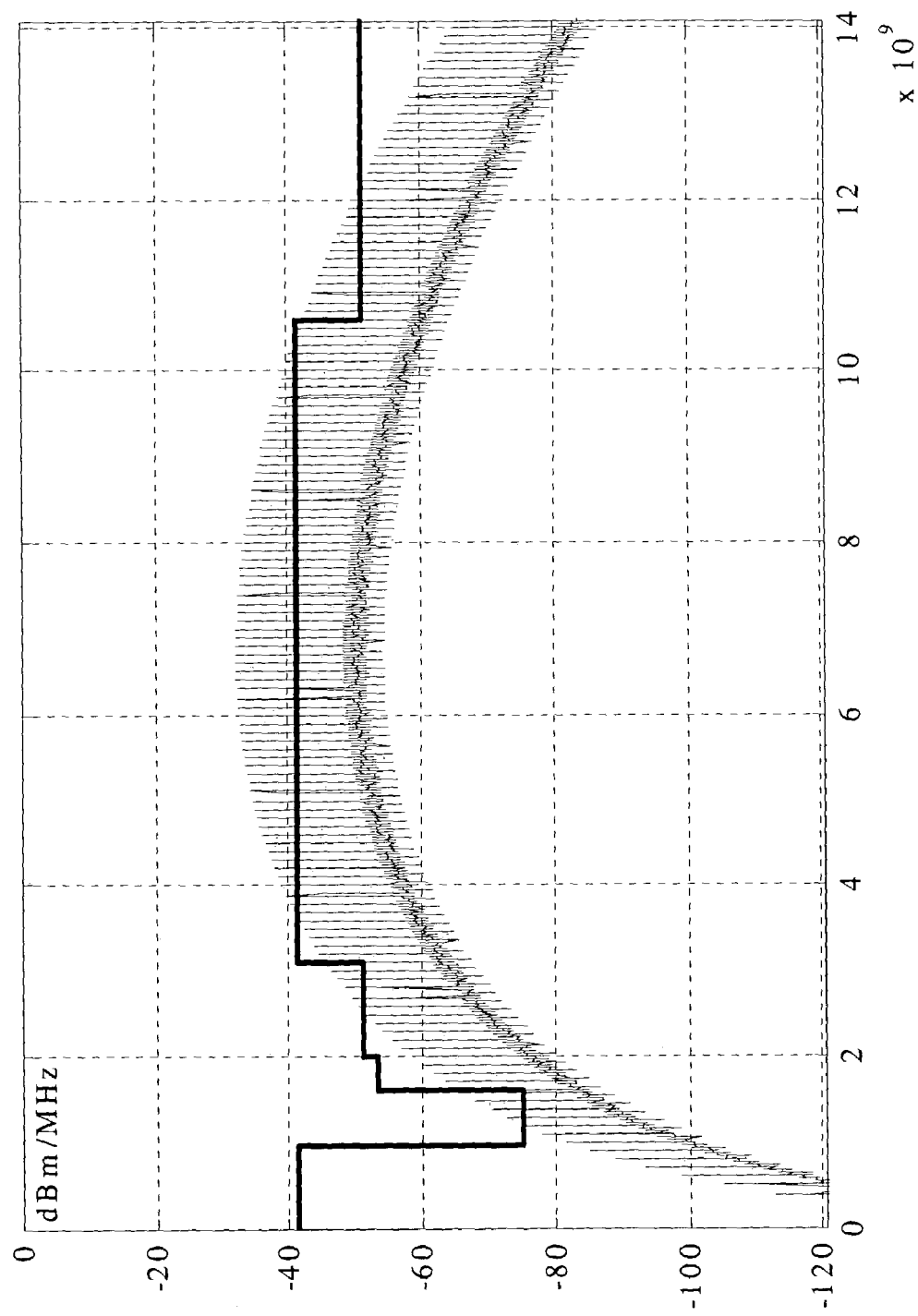
FIG. 11 is a PSD of the signal of FIG. 10.

FIG. 11 shows the spectrum of this signal.

Figure 12:
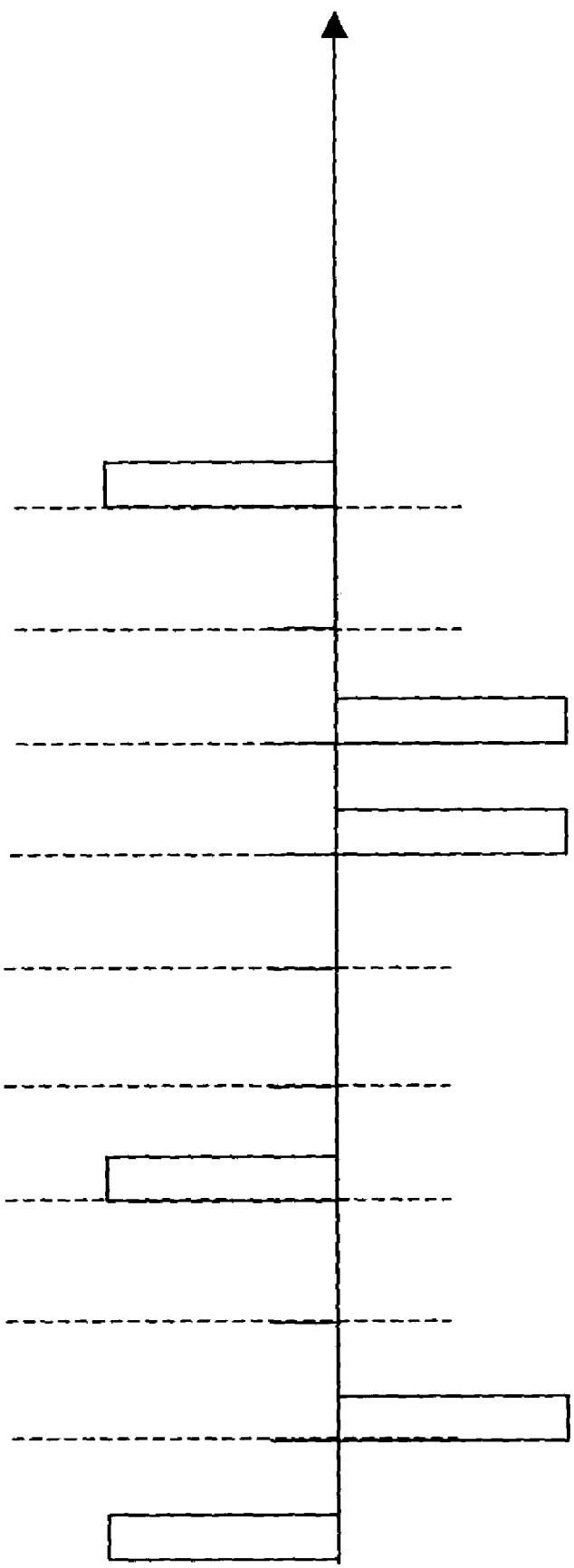
FIG. 12 is a pulse train generated by pulse amplitude modulation after modification.

FIG. 12 shows that after changing randomly the polarity of the symbols, the discrete part of the power spectrum density is eliminated as given by Equation (7):

$$G_s(f) = \frac{1}{T_s^2} \cdot \sum_{n=-\infty}^{+\infty} \left( \left| \frac{P_1}{2} \cdot S_1\left(\frac{n}{T_s}\right) - \frac{P_1}{2} \cdot S_1\left(\frac{n}{T_s}\right) \right|^2 \delta\left(f - \frac{n}{T_s}\right) \right) = 0, \quad (7)$$

Figure 13:
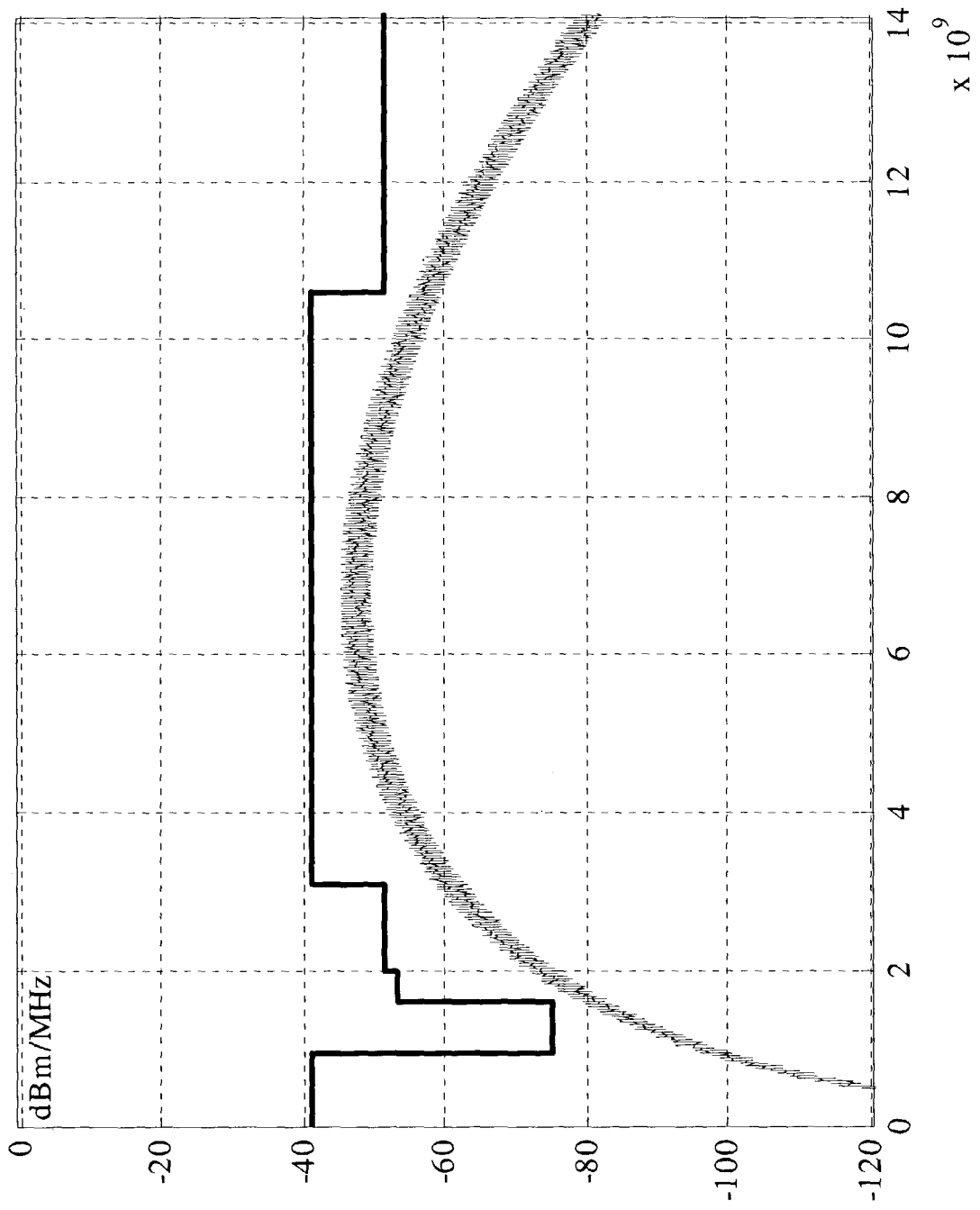
FIG. 13 a PSD of the signal of FIG. 12.
Figure 14:
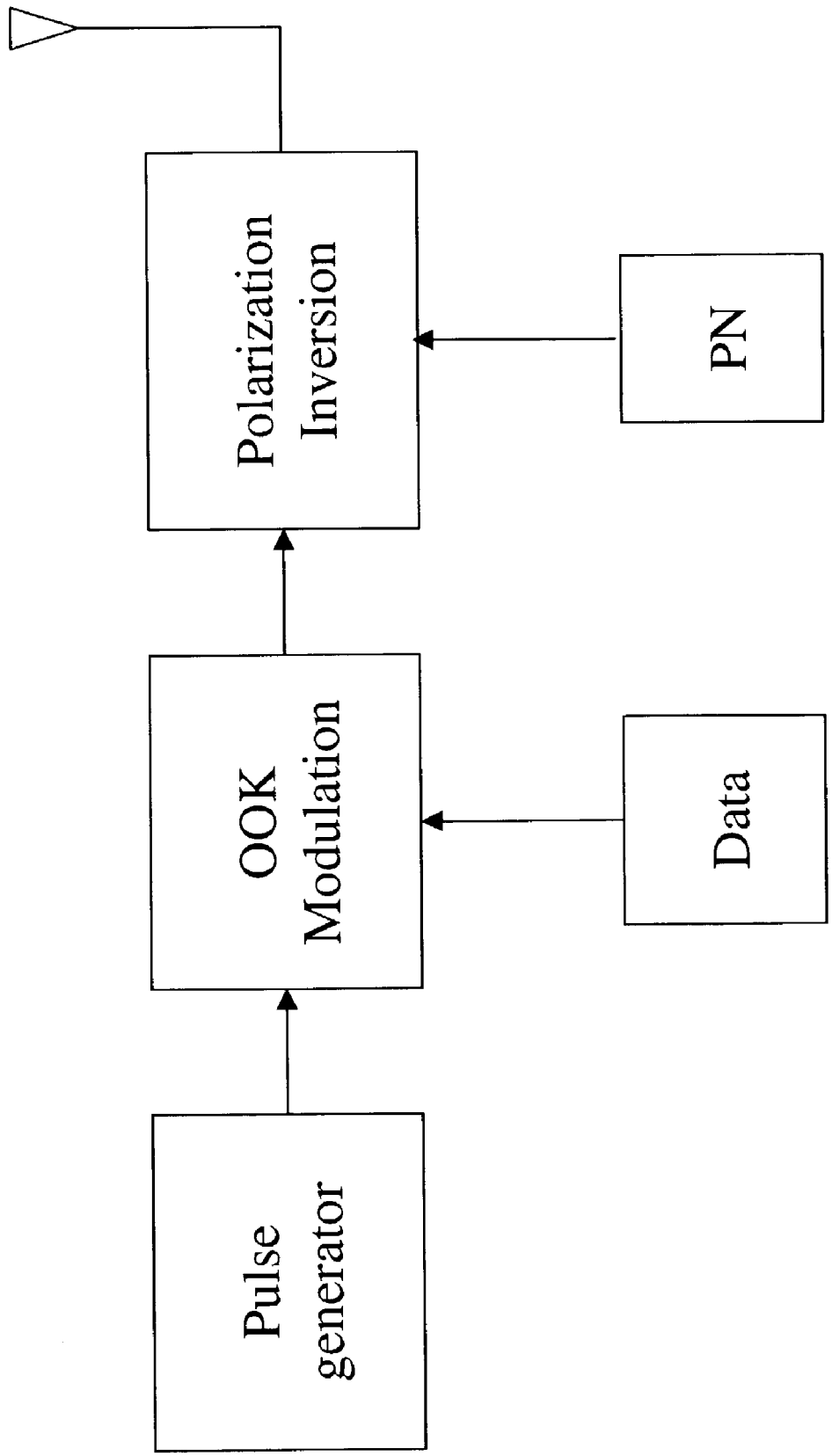
FIG. 14 is a block diagram of a system for generating the signal of FIG. 12.

FIG. 13 shows the spectrum of this signal, and FIG. 14 shows the system and method according to the invention to achieve this results.

Multiple Pulses Per Symbol

The waveform of each symbol can also be constituted by a combination of individual pulses.

Pulse Position Modulation

Random Polarity of Pulses within Symbol Duration

Figure 15:
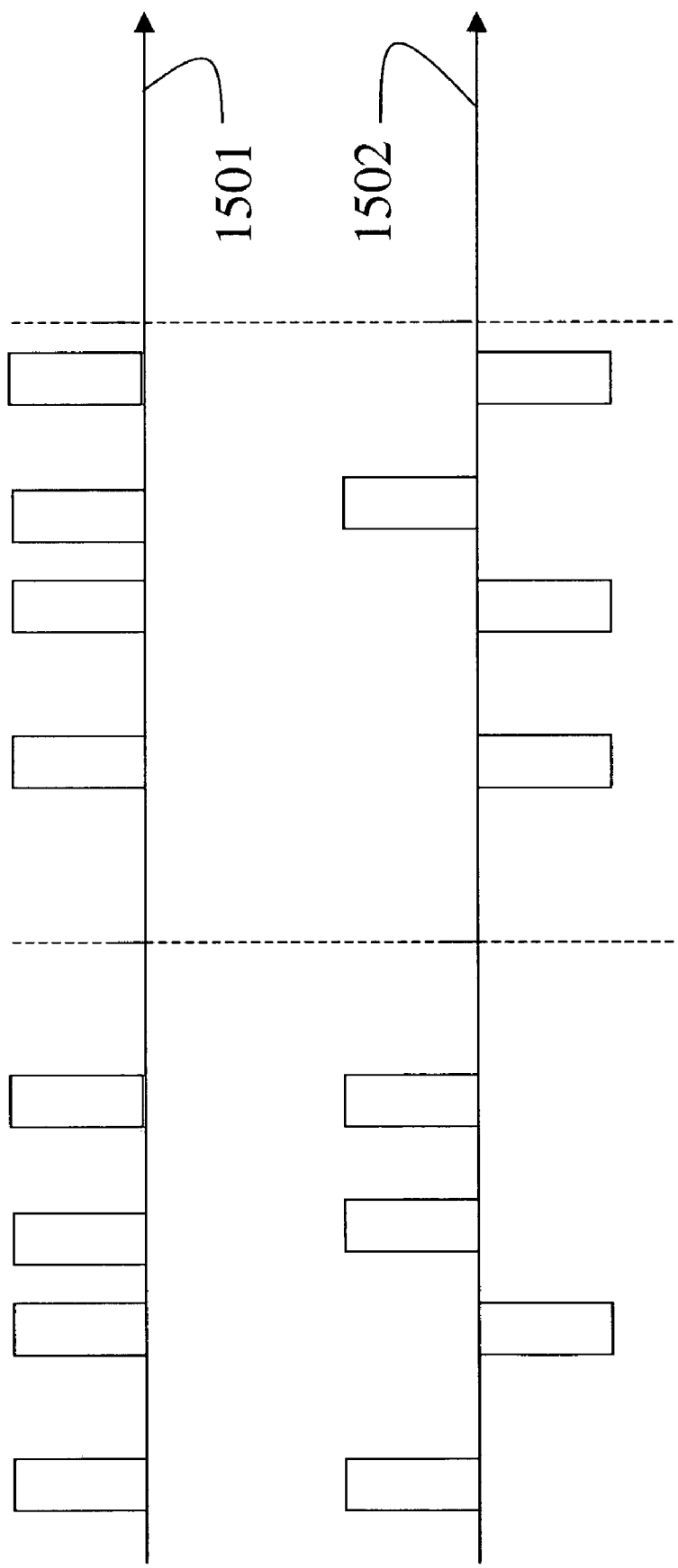
FIG. 15 are pulse trains before and after modification of pulses within symbol durations according to the invention.

Here, the symbol is a combination of N pulses. By changing the polarity of the pulses randomly and independently within the symbol, and from symbol to symbol, the spectral lines are eliminated. FIG. 15 shows the signal before 1501 and after 1502 inverting the polarity of random pulses.

Random Polarity of Pulses from Symbol to Symbol

Figure 16:
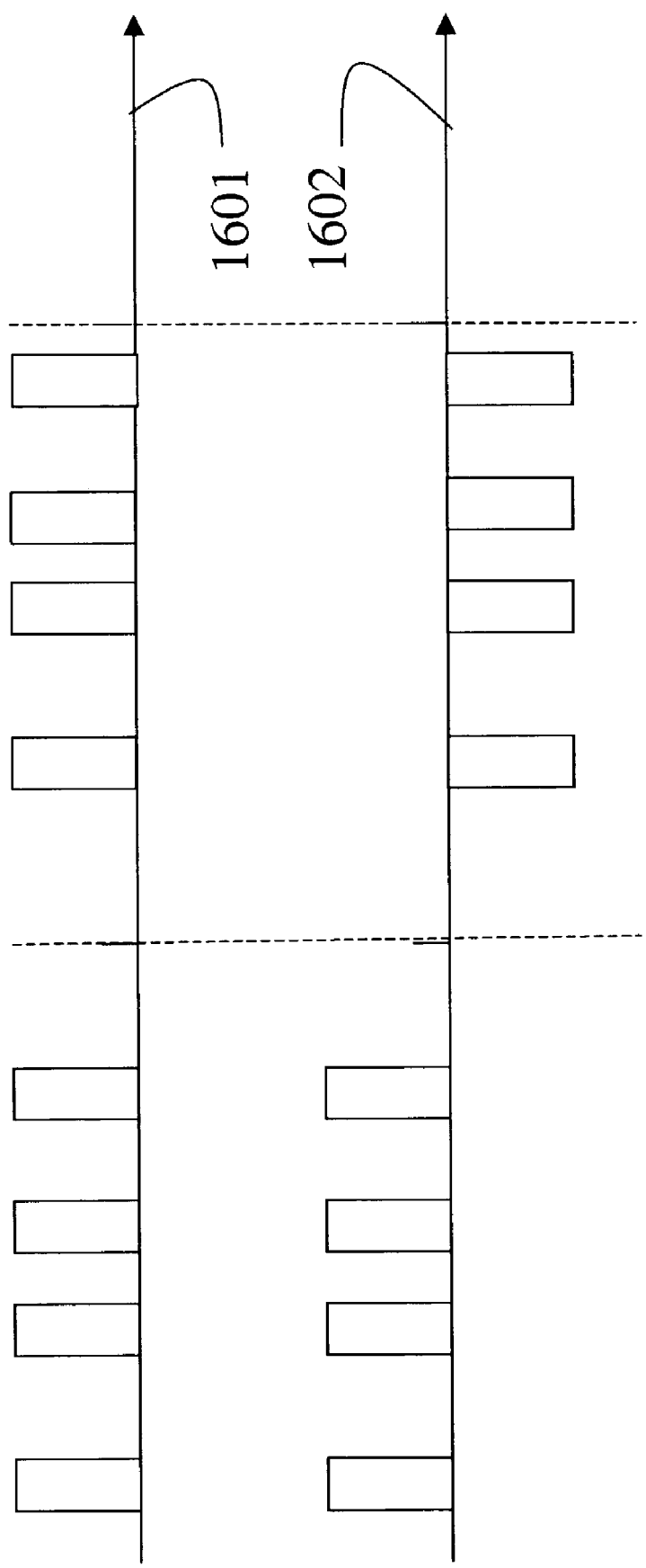
FIG. 16 are pulse trains before and after modification from symbol to symbol according to the invention.

Here, the symbol is a combination of N pulses. By changing randomly independently the polarity from symbol to symbol, the spectral lines are eliminated. FIG. 16 shows the signal before 1601 and after 1602 polarity inversion.

Identical Set of Different Polarities for Pulses in Symbol Duration

Figure 17:
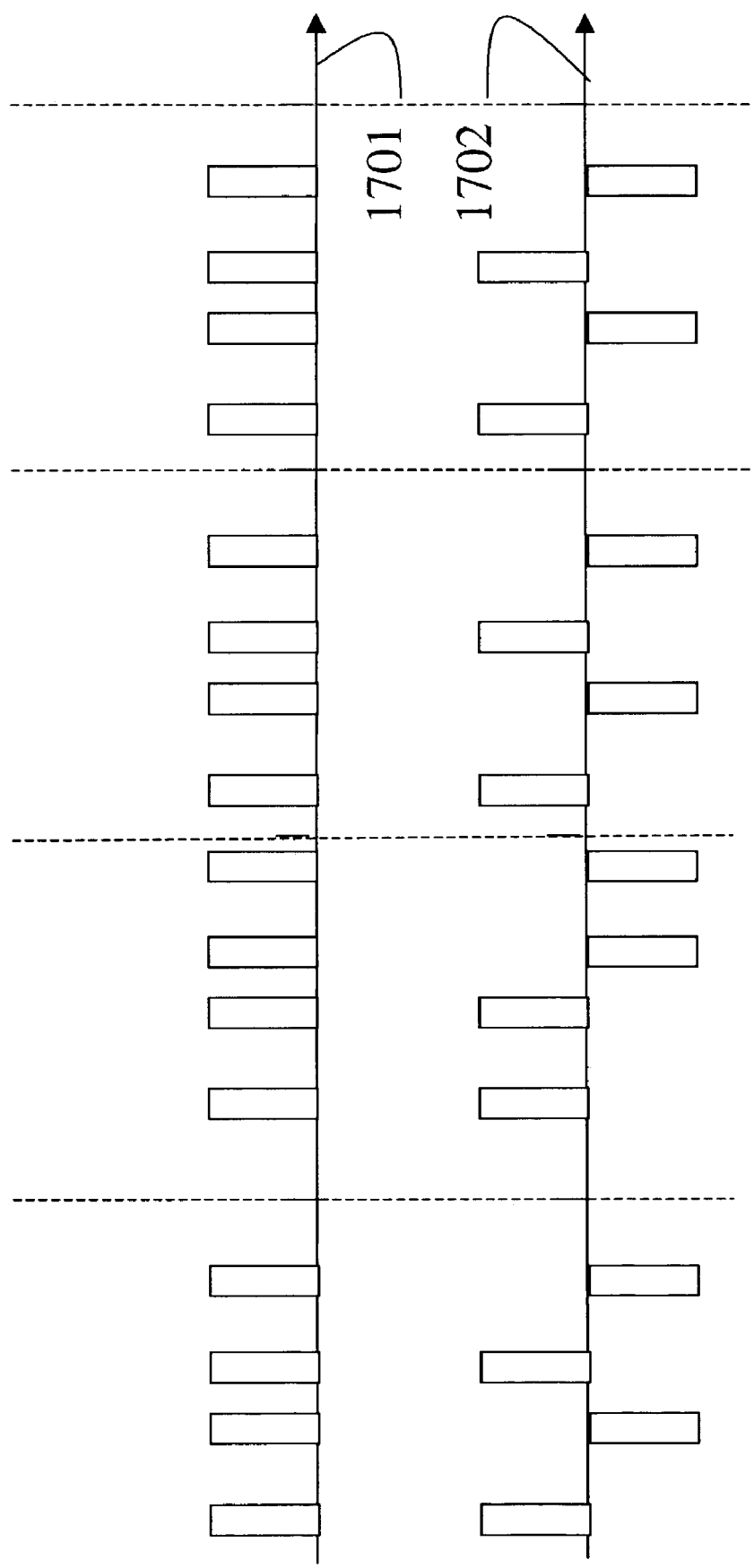
FIG. 17 are pulse trains before and after modification within symbol duration according to the invention.

In this case, the symbol is a combination of N pulses. The polarity of the pulses within the symbol is randomly changed for each of the M symbols of the constellation. A polarity pattern is thus affected for each symbol of the constellation. FIG. 17 shows the signal before 1701 and after 1702 random polarization inversion.

Pulse Amplitude Modulation

Here, the symbols are composed by a TH sequence whose amplitude varies.

Random Polarity of Pulses within Symbol Duration

Figure 18:
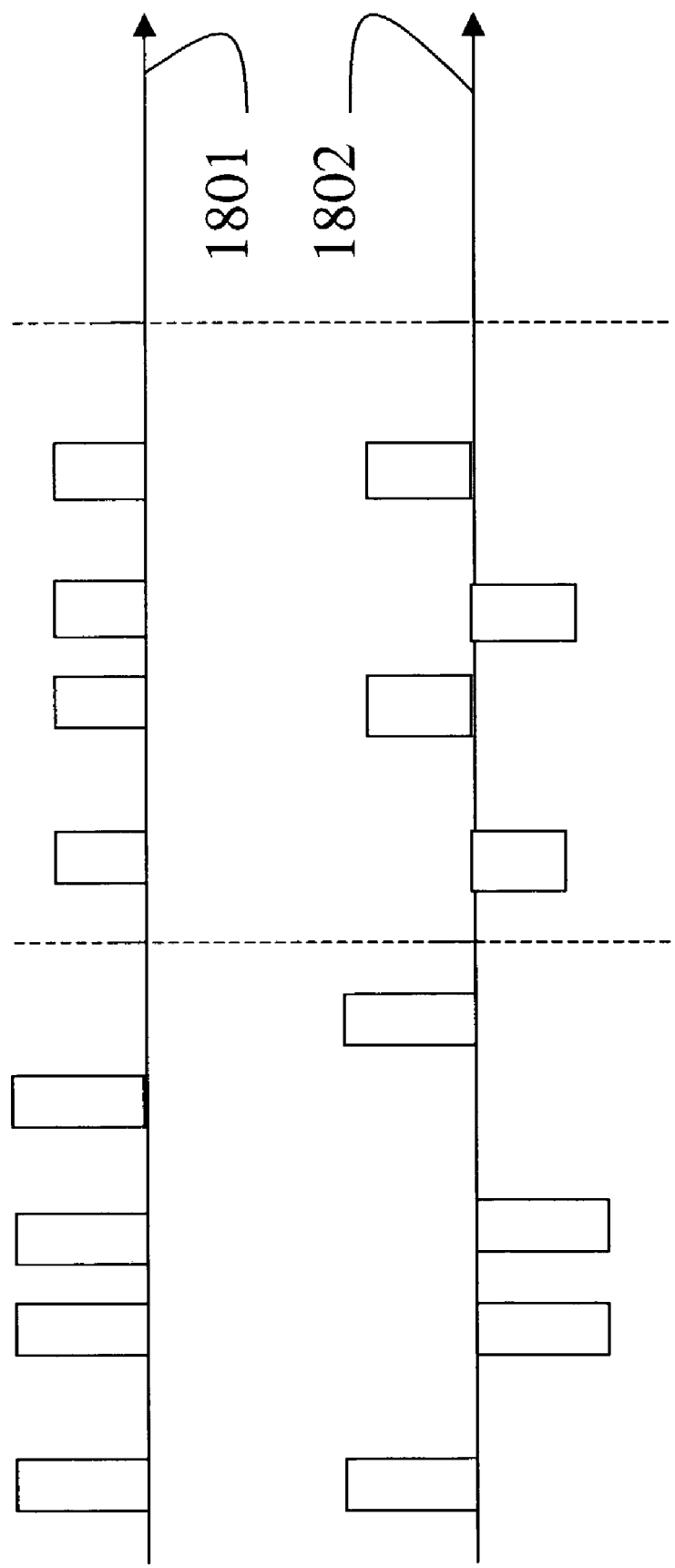
FIG. 18 are pulse trains before and after modification within symbol duration.

The symbol is a combination of N pulses. By changing randomly independently the polarity of the pulses within the symbol and from symbol to symbol, as shown in FIG. 18, the spectral lines are eliminated.

Random Polarity of Pulses from Symbol to Symbol

Figure 19:
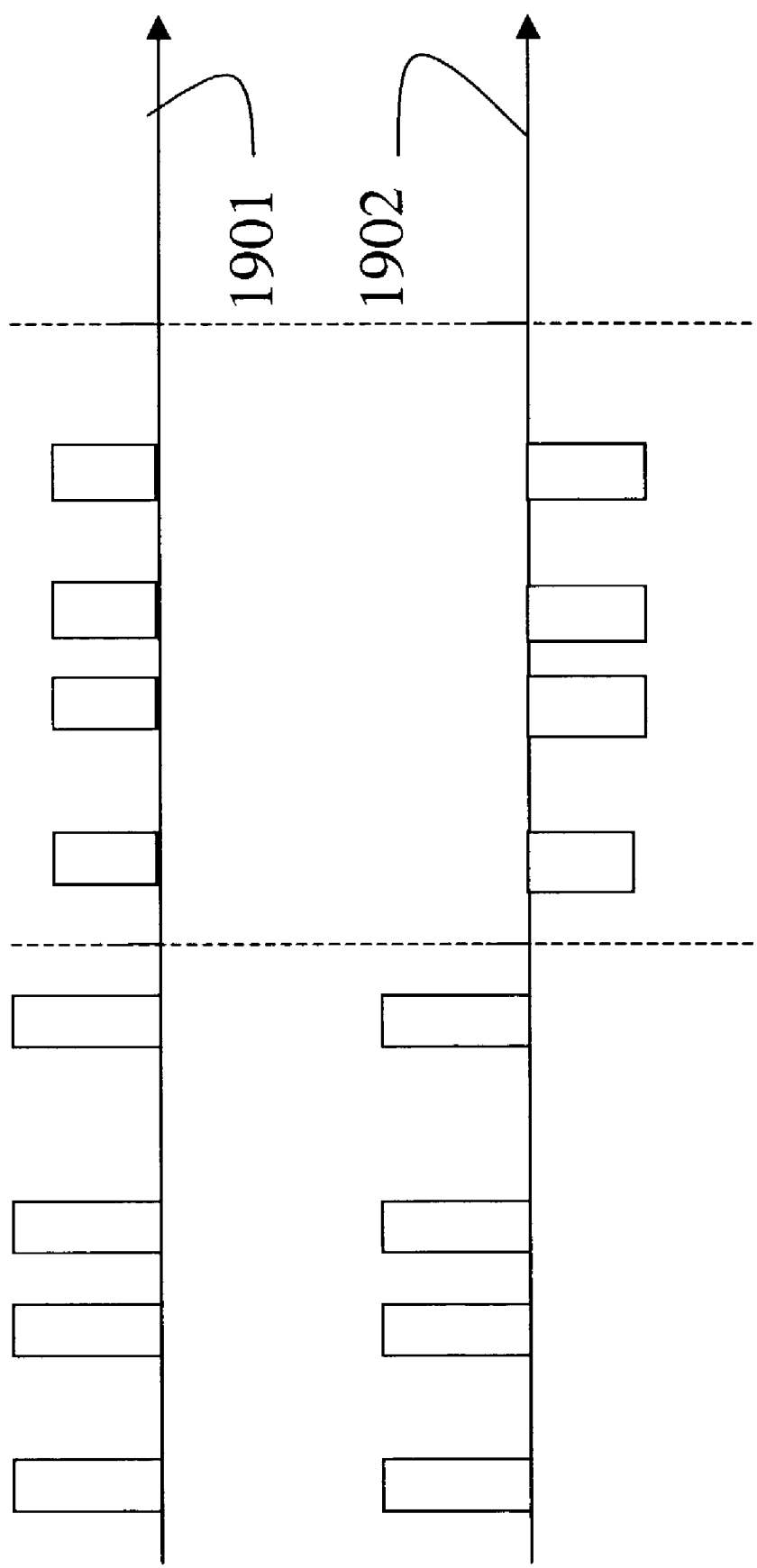
FIG. 19 are pulse trains before and after modification from symbol to symbol.

The symbol is a combination of N pulses. By changing randomly the polarity from symbol to symbol, as shown in FIG. 19, the spectral lines are eliminated.

Identical Set of Different Polarities for Pulses in Symbol Duration

Figure 20:
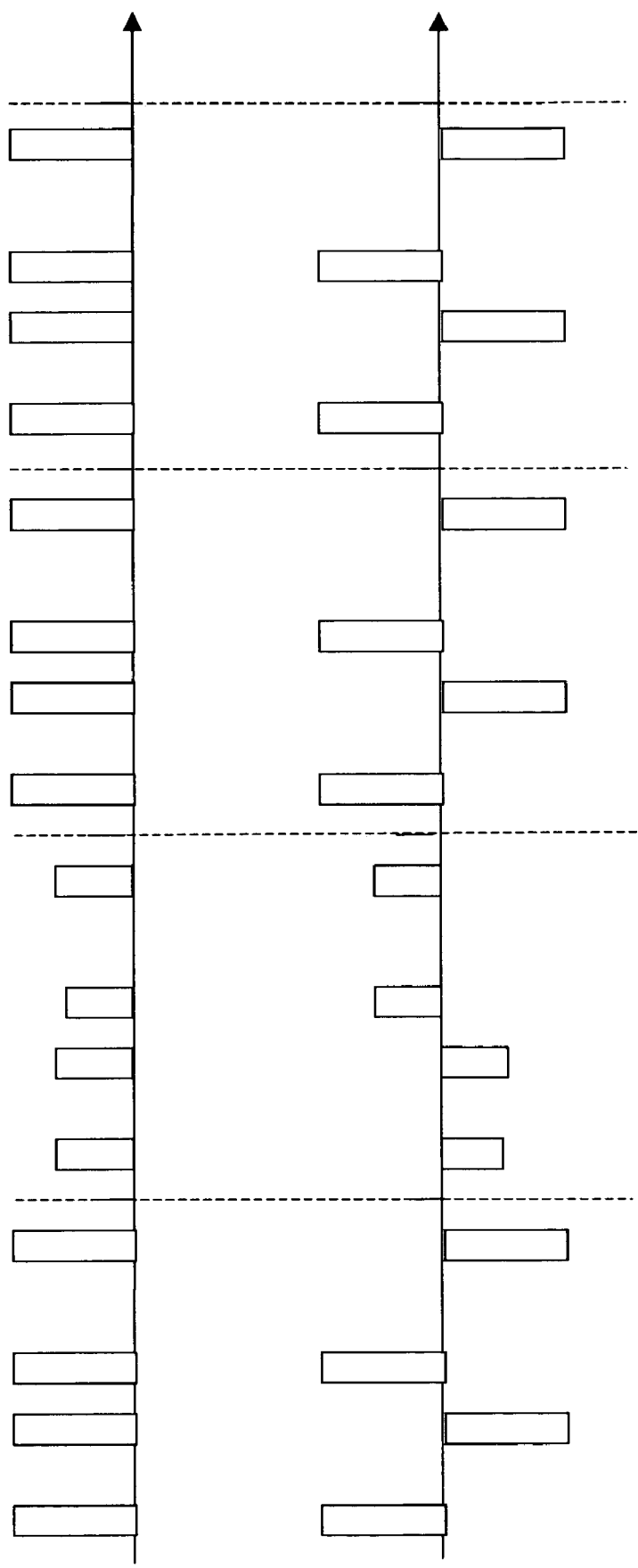
FIG. 20 are pulse trains before and after modification within symbol duration.

The symbol is a combination of N pulses. The polarity of the pulses within the symbol is randomly changed for each of the M symbols of the constellation, as shown in FIG. 20. A polarity pattern is thus affected for each symbol of the constellation.

Different Modulation Schemes

The random polarity can be applied to other modulation schemes. The symbols can be coded by different TH sequences for example. The $m^{th}$ symbol is a combination of $n_m$ pulses.

Random Polarity of Pulses within Symbol Duration

Figure 21:
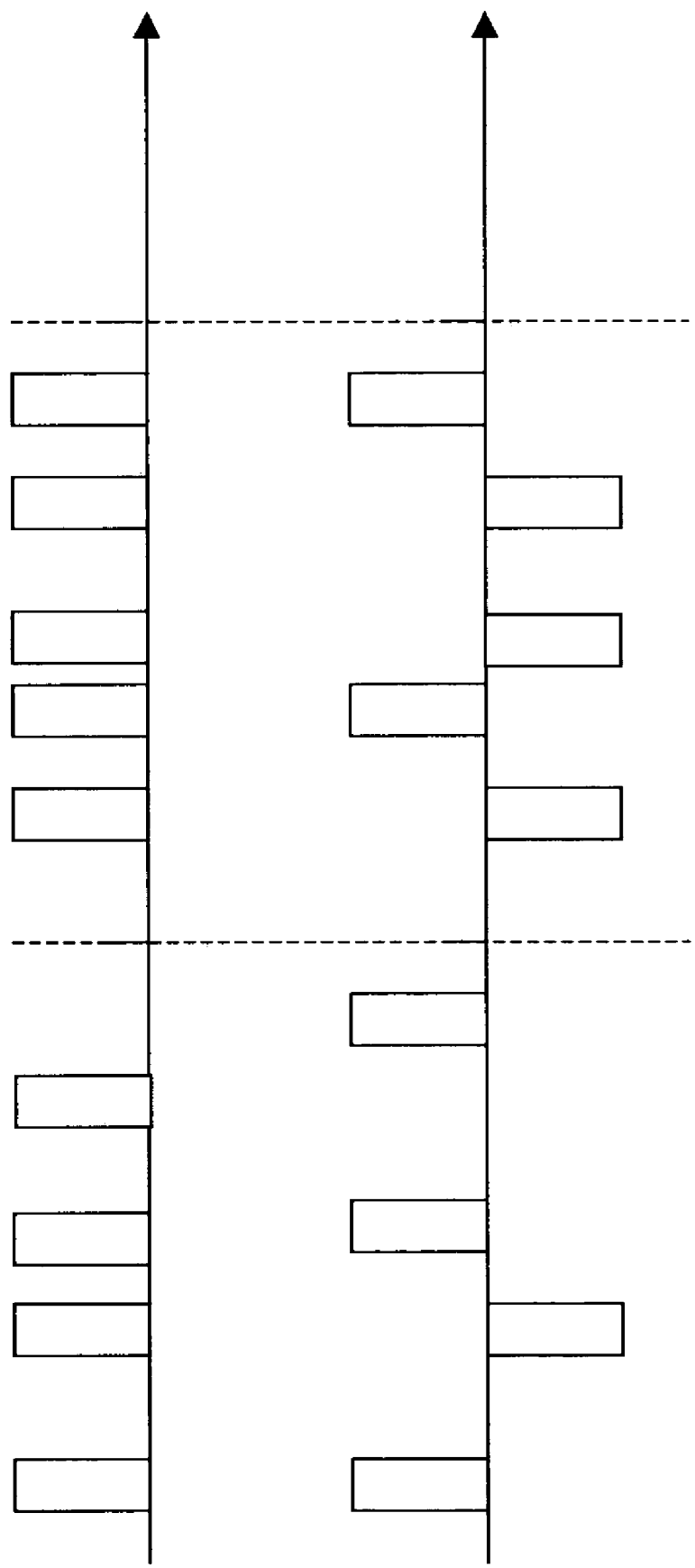
FIG. 21 are pulse trains before and after modification within symbol duration.

By changing randomly independently the polarity of the pulses within the symbol and from symbol to symbol, as shown in FIG. 21, the spectral lines disappear.

Random Polarity of Pulses from Symbol to Symbol

Figure 22:
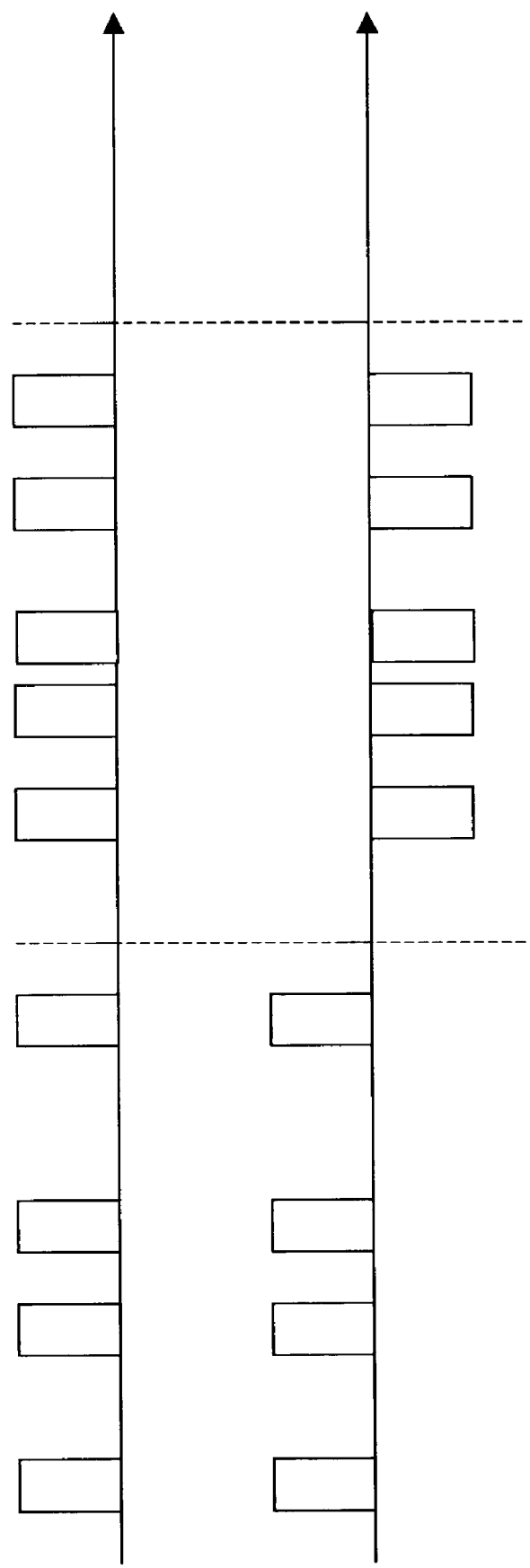
FIG. 22 are pulse trains before and after modification from symbol to symbol.

By changing randomly independently the polarity from symbol to symbol, as shown in FIG. 22, the spectral lines disappear too.

Identical Set of Different Polarities for Pulses in Symbol Duration

Figure 23:
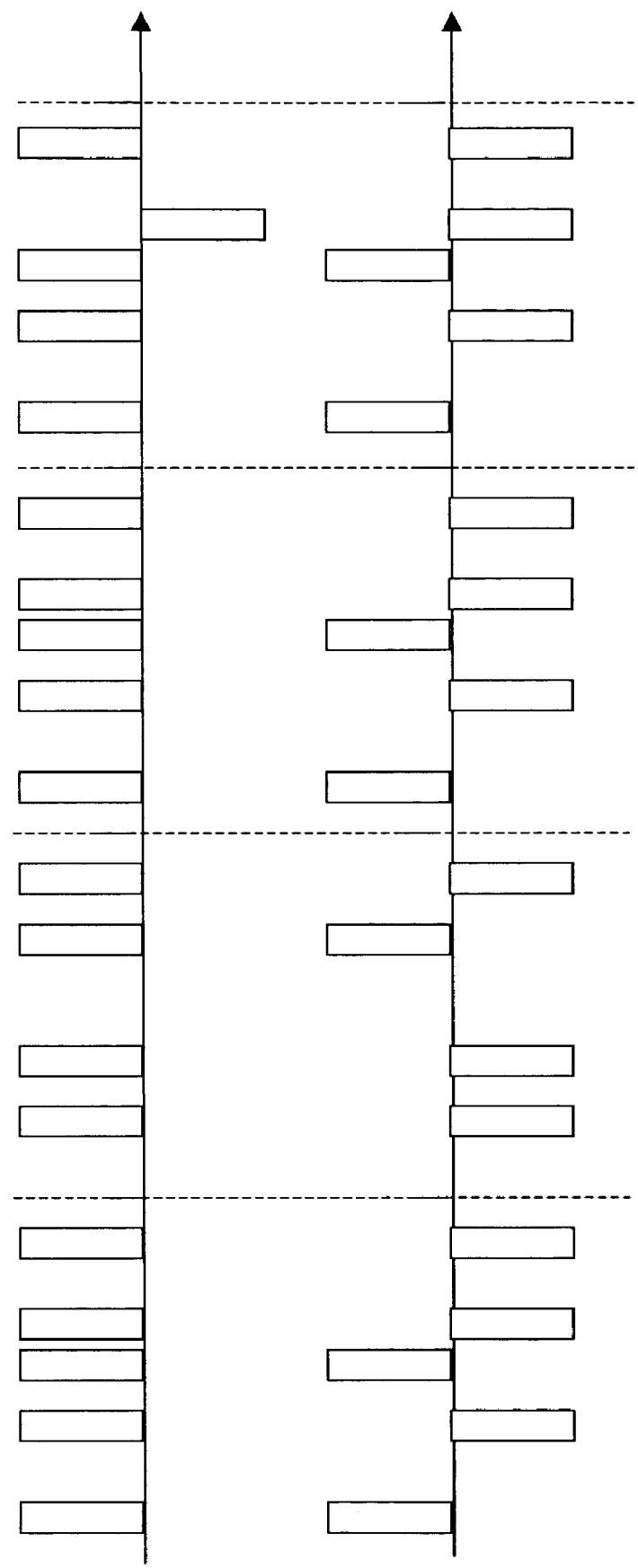
FIG. 23 are pulse trains before and after modification within symbol duration.

The polarity of the pulses within the symbol can be randomly changed for each of the M symbols of the constellation, as shown in FIG. 23. A polarity pattern is thus affected for each symbol of the constellation.

Random Polarity for Spectrum Shaping

As described above, the spectral lines disappear when the polarity changes from symbol to symbol. The continuous part of the spectrum can be derived from Equation (1). The power spectrum of the signal before polarity changes is:

$$G_s(f) = \frac{1}{M^2 T_s^2} \cdot \sum_{n=-\infty}^{+\infty} \left( \left| \sum_{i=0}^{M-1} S_i\left(\frac{n}{T_s}\right) \right|^2 \delta\left(f - \frac{n}{T_s}\right) \right) + \frac{1}{T_s} \left( \sum_{i=0}^{M-1} \frac{1}{M} \cdot |S_i(f)|^2 - \left| \sum_{i=0}^{M-1} \frac{1}{M} \cdot S_i(f) \right|^2 \right).$$

after polarity changes:

$$G_s(f) = \frac{1}{M^2 T_s^2} \cdot \sum_{n=-\infty}^{+\infty} \left( \left| \frac{1}{2} \sum_{i=0}^{M-1} S_i\left(\frac{n}{T_s}\right) + \frac{1}{2} \sum_{j=0}^{M-1} S_j\left(\frac{n}{T_s}\right) \right|^2 \delta\left(f - \frac{n}{T_s}\right) \right) + \frac{1}{T_s} \left( \sum_{i=0}^{M-1} \frac{1}{M} \cdot |S_i(f)|^2 - \left| \frac{1}{M} \sum_{i=0}^{M-1} \frac{1}{2} S_i(f) + \frac{1}{M} \sum_{j=0}^{M-1} \frac{1}{2} S_j(f) \right|^2 \right).$$

The symbols $s_{i+M}$ are the symbols $s_i$ with an opposite polarity. Hence $S_{i+M} = -S_i$ for i from 0 to M−1.

$$G_s(f) = \frac{1}{M^2 T_s^2} \cdot \frac{1}{2} \sum_{n=-\infty}^{+\infty} \left( \left| \sum_{i=0}^{M-1} \left( S_i\left(\frac{n}{T_s}\right) - S_i\left(\frac{n}{T_s}\right) \right) \right|^2 \delta\left(f - \frac{n}{T_s}\right) \right) + \frac{1}{T_s} \left( \sum_{i=0}^{M-1} \frac{1}{M} \cdot |S_i(f)|^2 - \left| \frac{1}{2M} \sum_{i=0}^{M-1} (S_i(f) - S_i(f)) \right|^2 \right) \quad (8)$$

$$G_s(f) = \frac{1}{M \cdot T_s} \sum_{i=0}^{M-1} |S_i(f)|^2.$$

From Equation (8), it appears that the spectrum of the signal is defined by the summation of the spectrum of the symbols. For example if the symbols have the same waveform, the spectral properties of the signal are identical to the spectral properties of this waveform.

That is the case for example for the PAM and PPM schemes. For the PPM, the same waveform is delayed in time, and for the PAM, the waveform is associated with different amplitudes in order to create the different symbols.

Considering Equation (8), changing randomly the polarity from symbol to symbol provides an efficient way to shape the spectrum. The task of spectrum shaping of the signal is determined by the design of the waveform.

Thus, the waveform of the symbol characterizes entirely the spectrum of the whole signal. If the spectrum of this waveform contains nulls, then the power spectral density function of the modulated signal gets the same nulls.

For example, a TH sequence of four pulses constitutes the waveform of the symbol. The modulation is a 2PPM. Thus, the Fourier transform of the TH sequence defines the power spectral density of the total signal. As well as their position or amplitude, the polarity of these four pulses can be used to shape the spectrum in order to create nulls in the spectrum.

Figure 24:
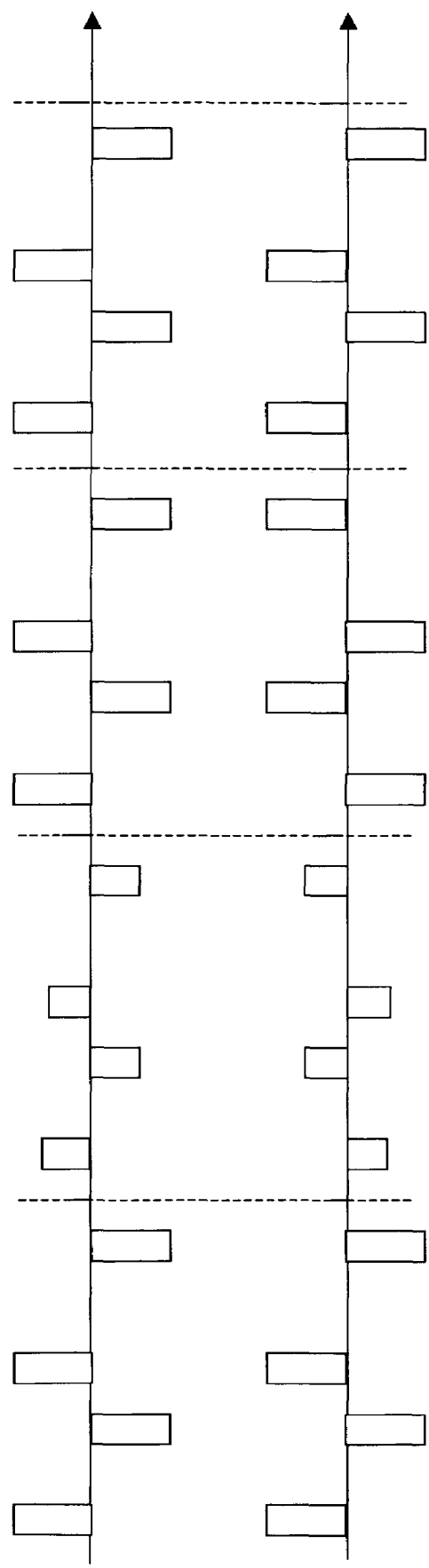
FIG. 24 are pulse trains before and after modification within symbol duration and from symbol to symbol.
Figure 25:
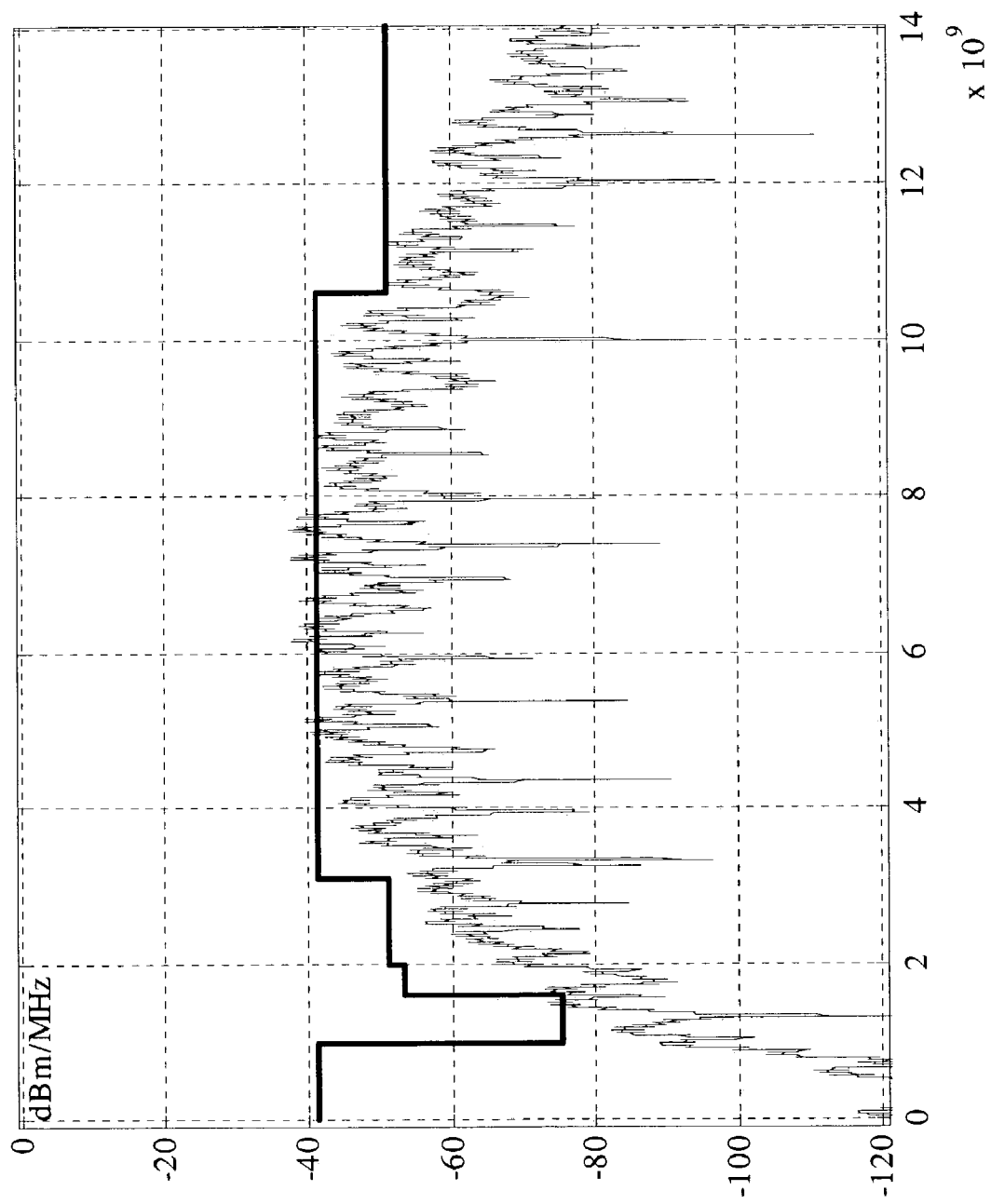
FIG. 25 is a PSD of the signal of FIG. 24 after modification.

In the example of FIG. 24, the modulation scheme is PAM. A TH sequence constitute the symbols. The polarity sequence for the pulses composing the TH sequence modify the spectral characteristics of the signal. Furthermore, the polarity is random from symbol to symbol to eliminate spectral lines as shown in FIG. 25.

Random Polarity of Sub-Structures of Symbols

Here, the waveform of the symbol is a combination of several identical subwaveform dithered in time (PPM scheme). In addition, different pulse amplitude modulation (PAM) schemes can be applied. By changing randomly the polarity of these substructure, the power spectral density of the substructure is identical to the power spectral density of the symbol, and thus, of the total signal.

This mode can be used for the design of a TH sequence for multi-user detection with nulls at specific frequency in order to reduce interference with narrow band systems.

Figure 26:
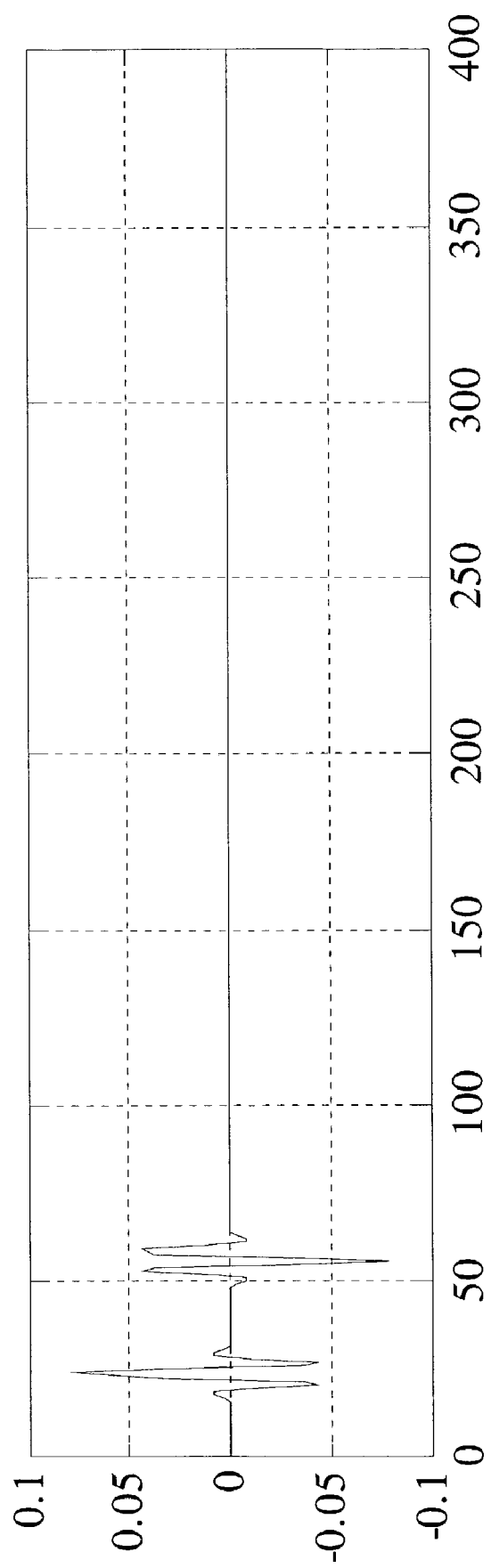
FIG. 26 is a subwaveform with two pulses of opposite polarity.
Figure 27:
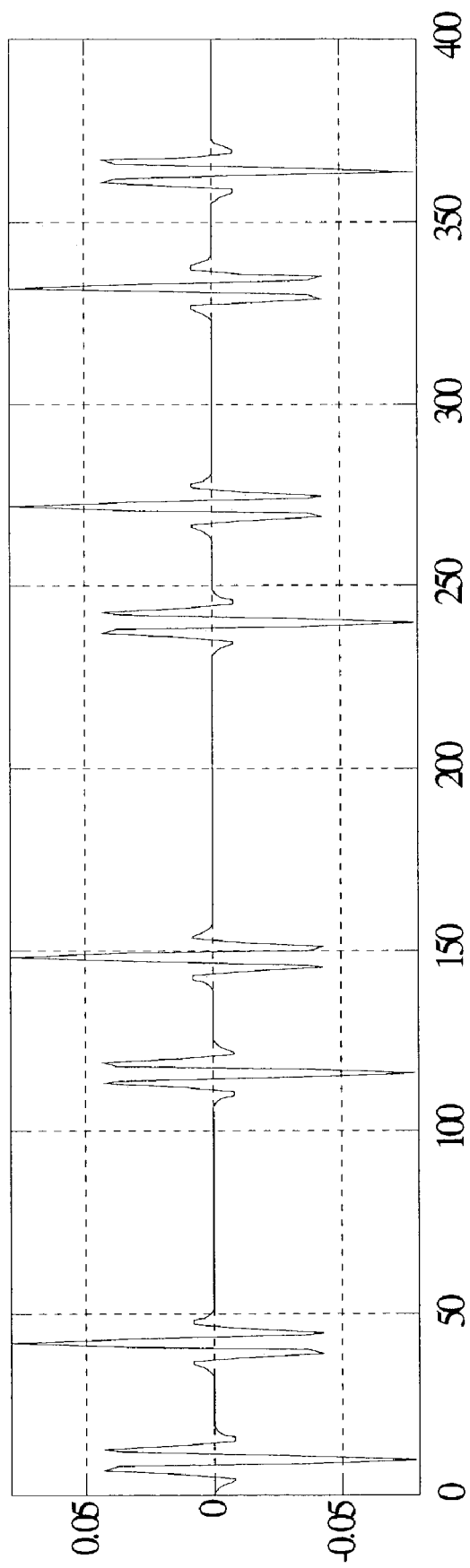
FIG. 27 is a time hopping sequence with four subwaveforms.
Figure 28:
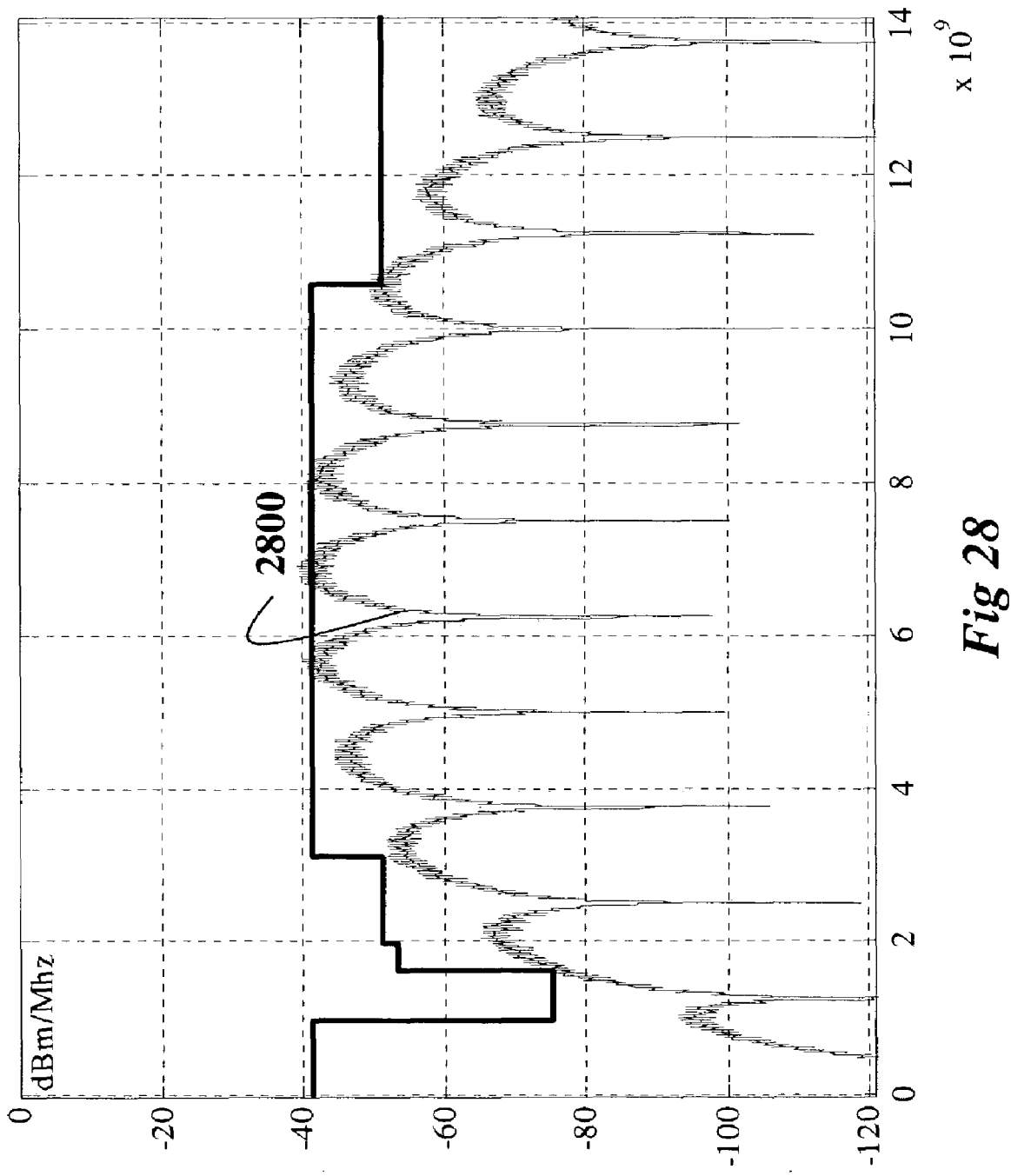
FIG. 28 is the PSD of the signal of FIG. 27.

In the example shown in FIG. 26, the subwaveform is a grouping of two pulses with an opposite polarity. FIG. 27 shows a TH sequence composed of four subwaveforms with two grouped pulses each. As shown in FIG. 28, the power spectrum density for this TH sequence does not have spectral lines and contains nulls periodically. One is at 5 GHz, i.e., notches 2800, to avoid interference with the 802.11a standard.

Hence, the random polarity reversal eliminates the spectral lines, shapes the continuous part of the spectrum, and enables a flexible design of a multi-user receiver. This subwaveform can be used to generate a TH sequence independently of the spectral characteristics of the symbols.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for eliminating spectral lines in a time hopping ultra wide bandwidth signal, comprising:
   generating a train of non-periodic pulses;
   modulating the non-periodic pulses in time according to uncorrelated symbols; and
   inverting, randomly, a polarity of the non-periodic pulses before transmitting the non-periodic pulses as an ultra wide bandwidth signal.

2. The method of claim 1 wherein each uncorrelated symbol includes one non-periodic pulse.

3. The method of claim 2 wherein the modulation of the one non-periodic pulse per uncorrelated symbol is pulse position modulation.

4. The method of claim 2 wherein the modulation of the one non-periodic pulse per uncorrelated symbol is amplitude modulation.

5. The method of claim 2 wherein the modulation of the one non-periodic pulse per uncorrelated symbol is a combination of amplitude modulation and pulse position modulation.

6. The method of claim 4 wherein the pulse amplitude modulation is accomplished with on/off keying, wherein for every time period a zero is represented by a non-periodic pulse, and a one by no pulse.

7. The method of claim 1 wherein each uncorrelated symbol includes a combination of individual non-periodic pulses.

8. The method of claim 7 wherein the polarity of a combination of N non-periodic pulses of each uncorrelated symbol is randomly and independently inverted from uncorrelated symbol to uncorrelated symbol.

9. The method of claim 7 wherein the polarity of individual non-periodic pulses of each uncorrelated symbol are randomly and independently inverted within each uncorrelated symbol and from uncorrelated symbol to uncorrelated symbol.

10. The method of claim 7 wherein the polarity of individual non-periodic pulses of each uncorrelated symbol are randomly inverted within each uncorrelated symbol and identically inverted from uncorrelated symbol to uncorrelated symbol.

11. The method of claim 7 wherein the uncorrelated symbols are modulated by pulse position modulation.

12. The method of claim 7 where the uncorrelated symbols are modulated by amplitude modulation.

13. The method of claim 7 wherein the uncorrelated symbols are modulated by a combination of pulse position modulation and amplitude modulation.

14. The method of claim 7 wherein the combination of non-periodic pulses follows a pattern of a time hopping sequence.

15. The method of claim 14 wherein different time hopping sequences are used to encode a same uncorrelated symbol of a constellation.

16. The method of claim 1 further comprising:
   shaping a spectrum of the UWB signal to a predetermined shape by the random inverting of the polarity of the non-periodic pulses.

17. The method of claim 16 wherein the modulating is pulse amplitude modulation.

18. The method of claim 16 wherein the modulating is pulse position modulation.

19. The method of claim 14 wherein the modulating is a combination of pulse amplitude modulation and pulse position modulation.

20. The method of claim 7 further comprising:
   shaping a spectrum of the UWB signal to a predetermined shape by the random inverting of the polarity of the non-periodic pulses.

21. The method of claim 20 wherein the modulating is pulse amplitude modulation.

22. The method of claim 20 wherein the modulating is pulse position modulation.

23. The method of claim 20 wherein the modulating is a combination of pulse amplitude modulation and pulse position modulation.

24. The method of claim 9 further comprising:
   shaping a spectrum of the UWB signal to a predetermined shape by the random inverting of the polarity of the non-periodic pulses.

25. The method of claim 14 further comprising:
   shaping a spectrum of the UWB signal to a predetermined shape by the random inverting of the polarity of the non-periodic pulses.

26. The method of claim 1 further comprising:
   grouping sets of non-periodic pulses into subwaveforms; and
   means for inverting, randomly a polarity of the subwaveforms.

27. The method of claim 26 further comprising:
   shaping a spectrum of the UWB signal to a predetermined shape by the random inverting of the polarity of the subwaveforms.

28. The method of claim 2 further comprising:
   grouping sets of uncorrelated symbols;
   means for inverting, randomly, a polarity of the uncorrelated symbols a first set of the sets of uncorrelated symbols; and
   means for inverting a polarity of a next set of the sets of uncorrelated symbols according to the polarity of the uncorrelated symbols of the first set.

29. A system for eliminating spectral lines in a time hopping ultra wide bandwidth signal, comprising:
   means for generating a train of non-periodic pulses;
   means for modulating the non-periodic pulses in time according to uncorrelated symbols; and
   means for inverting, randomly, a polarity of the non-periodic pulses before transmitting the non-periodic pulses as an ultra wide bandwidth signal.

* * * * *